US012296604B2

(12) United States Patent
Fujita et al.

(10) Patent No.: US 12,296,604 B2
(45) Date of Patent: May 13, 2025

(54) PRINTER

(71) Applicant: SATO HOLDINGS KABUSHIKI KAISHA, Tokyo (JP)

(72) Inventors: Satoshi Fujita, Tokyo (JP); Kazuyuki Hoshi, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/035,709

(22) PCT Filed: Nov. 10, 2021

(86) PCT No.: PCT/JP2021/041325
§ 371 (c)(1),
(2) Date: May 5, 2023

(87) PCT Pub. No.: WO2022/107656
PCT Pub. Date: May 27, 2022

(65) Prior Publication Data

US 2023/0406016 A1 Dec. 21, 2023

(30) Foreign Application Priority Data

Nov. 18, 2020 (JP) ................................ 2020-191920
Oct. 13, 2021 (JP) ................................ 2021-167817

(51) Int. Cl.
*B41J 2/32* (2006.01)
*B41J 11/04* (2006.01)
(Continued)

(52) U.S. Cl.
CPC ................. *B41J 29/13* (2013.01); *B41J 2/32* (2013.01); *B41J 11/04* (2013.01); *H01R 13/631* (2013.01)

(58) Field of Classification Search
CPC ........ B41J 29/13; B41J 11/04; B41J 11/0095; B41J 15/042; B41J 2/32; B41J 11/02;
(Continued)

(56) References Cited

U.S. PATENT DOCUMENTS

2004/0070662 A1 4/2004 Shimoda
2005/0162497 A1 7/2005 Matsui et al.
(Continued)

FOREIGN PATENT DOCUMENTS

CN 104118221 A 10/2014
CN 105383190 A 3/2016
(Continued)

OTHER PUBLICATIONS

Extended European Search Report issued in connection with EP Appl. No. 21894530.1 dated Feb. 20, 2024.
(Continued)

*Primary Examiner* — Kristal Feggins
(74) *Attorney, Agent, or Firm* — Foley & Lardner LLP

(57) ABSTRACT

An embodiment of the present invention is a printer including: a body case; a printer cover configured to be openable and closable relative to the body case about a rotary shaft; a platen roller that is rotatably attached the printer cover; a print head configured to pinch a print medium with the platen roller when the printer cover is closed and perform printing on the print medium; a first connector disposed at a first position of the body case; a second connector disposed at the printer cover such that the second connector is connected to the first connector when the printer cover is closed; and a platen retaining part disposed at the body case and configured to rotatably retain a first portion of the platen roller at a second position of the body case when the printer cover is closed, the first position being in the vicinity of the second position.

20 Claims, 19 Drawing Sheets

(51) Int. Cl.
*B41J 29/13* (2006.01)
*H01R 13/631* (2006.01)

(58) Field of Classification Search
CPC ......... B41J 11/053; B41J 11/057; B41J 11/06; B41J 11/08; B41J 11/10; B41J 11/13; H01R 13/631; H01R 13/2407; H01R 13/71; H01R 2201/06
See application file for complete search history.

(56) References Cited

U.S. PATENT DOCUMENTS

| | | | |
|---|---|---|---|
| 2014/0225973 | A1 | 8/2014 | Yada et al. |
| 2016/0059588 | A1 | 3/2016 | Aizawa |
| 2017/0182792 | A1 | 6/2017 | Tanizaki |
| 2019/0022884 | A1 | 1/2019 | Takahashi et al. |
| 2019/0299655 | A1 | 10/2019 | Kawai |

FOREIGN PATENT DOCUMENTS

| | | | |
|---|---|---|---|
| EP | 2 353 875 | A1 | 8/2011 |
| JP | 2004-122492 | A | 4/2004 |
| JP | 2004-196498 | A | 7/2004 |
| JP | 2005-205733 | A | 8/2005 |
| JP | 2014-188707 | A | 10/2014 |
| JP | 2014-198473 | A | 10/2014 |
| JP | 2014-231188 | A | 12/2014 |
| JP | 2017-114059 | A | 6/2017 |
| JP | 2019-018319 | A | 2/2019 |
| JP | 2019-177631 | A | 10/2019 |
| KR | 10-1409722 | B1 | 6/2014 |

OTHER PUBLICATIONS

Office Action issued in Chinese Appl. No. 202180076002.7 dated Mar. 15, 2025.

PRINTER

FIELD

The present invention relates to a printer that prints information on a print medium.

BACKGROUND

Conventionally, thermal printers that print on a print medium by thermal transfer are known (hereinafter simply referred to as "printers"). In such printers, a print medium is held in a pressurized state between a thermal head and a platen roller, and heating elements on the thermal head are selectively heated to print.

Some printers include a sheet holder, positioned near a printer unit in a body case for storing recording sheets, and a holder cover mounted on the sheet holder to be capable of opening and closing (e.g., Japanese Laid-open Patent publication No. 2005-205733). By the printer unit having its lock member engaged with an engaging project of the holder cover, the holder cover is fixed when the printer unit is closed. Here, the platen roller keeps its rotary shaft being guided by guide parts; and a connection terminal part on the body case side and a connector formed by a contact electrode 38 on the holder cover side keep being coupled to each other.

BRIEF SUMMARY

Technical Problem

However, in the holder cover of the printer in the Publication No. 2005-205733, the distance from the holder cover's rotary shaft to the point where the engaging project engages with the lock member is about half as great as the distance from the holder cover's rotary shaft to the holder cover's tip. On the other hand, in the holder cover, the distance from the holder cover's rotary shaft to the connector is substantially equal to the distance from the holder cover's rotary shaft to the holder cover's tip. Accordingly, the distance from the point where the engaging project engages with the lock member to the connecter becomes about half as long as the distance from the holder cover's rotary shaft to the holder cover's tip. In other words, the distance from the holder cover's rotary shaft to the connector is approximately twice as great as the distance from the holder cover's rotary shaft to the point where the engaging project engages with the lock member.

Accordingly, even when the engaging project engages with the lock member, the connection can become unstable.

In addition, if the position of the engaging project engaging with the lock member deviates in the rotation direction of the holder cover, the position of the contact electrode will deviate about twice as much in the same direction. This may impair the secure connection of the connector.

An object of the present invention is to provide a printer with excellent connection between a first connector on the body side and a second connector on the openable printer cover side.

Solution to Problem

An embodiment of the present invention is a printer including: a body case; a printer cover configured to be openable and closable relative to the body case about a rotary shaft; a platen roller that is rotatably attached the printer cover; a print head configured to pinch a print medium with the platen roller when the printer cover is closed and perform printing on the print medium; a first connector disposed at a first position of the body case; a second connector disposed at the printer cover such that the second connector is connected to the first connector when the printer cover is closed; and a platen retaining part disposed at the body case and configured to rotatably retain a first portion of the platen roller at a second position of the body case when the printer cover is closed, the first position being in the vicinity of the second position.

Advantageous Effects

An embodiment of the present invention improves the connection between the first connector on the body side and the second connector on the openable printer cover side.

DETAILED DESCRIPTION

In the following, a description will be given of embodiments of a printer of the present invention.

(1) Overall Structure of Printer

In the following, with reference to FIGS. 1A, 1B, and 2, a description will be given of a printer 1 according to an embodiment.

Figure 1A:
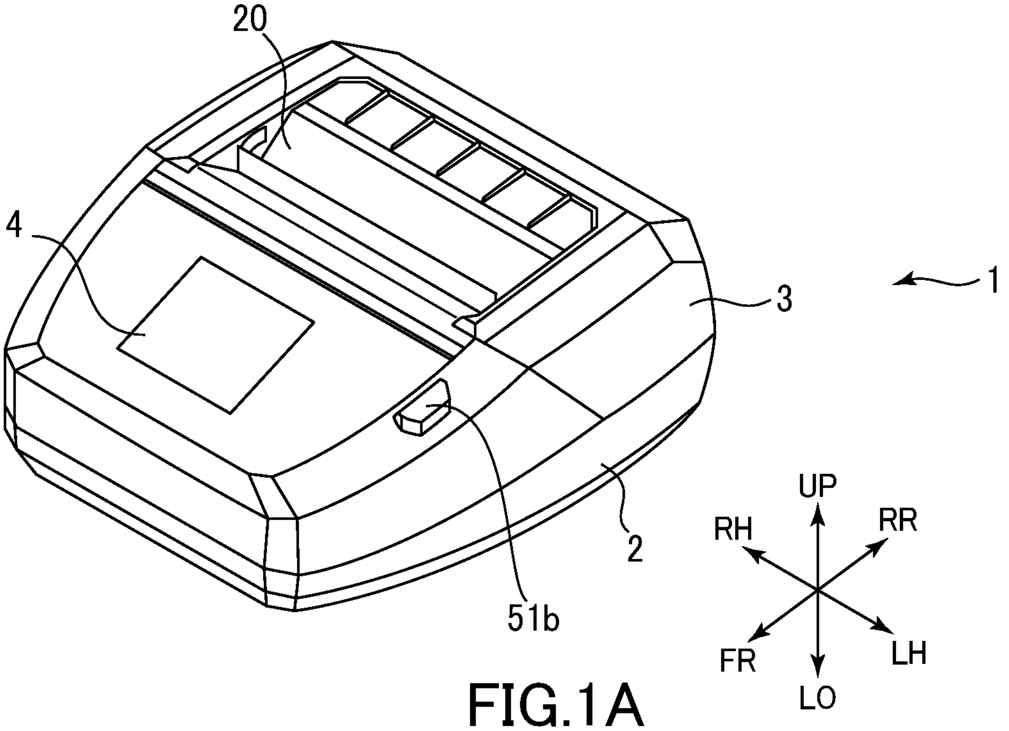
FIG. 1A is a perspective view of a printer according to an embodiment showing its front, left, and upper faces with its printer cover closed.

FIG. 1A is a perspective view of the printer 1 according to the embodiment showing its front, top, and left faces with its printer cover 3 closed. FIG. 1B is a perspective view of the printer 1 according to the embodiment showing its front, top, and left faces with its printer cover 3 open. FIG. 2 is a perspective view of the printer 1 according to the embodiment showing its upper and left faces.

Figure 1B:
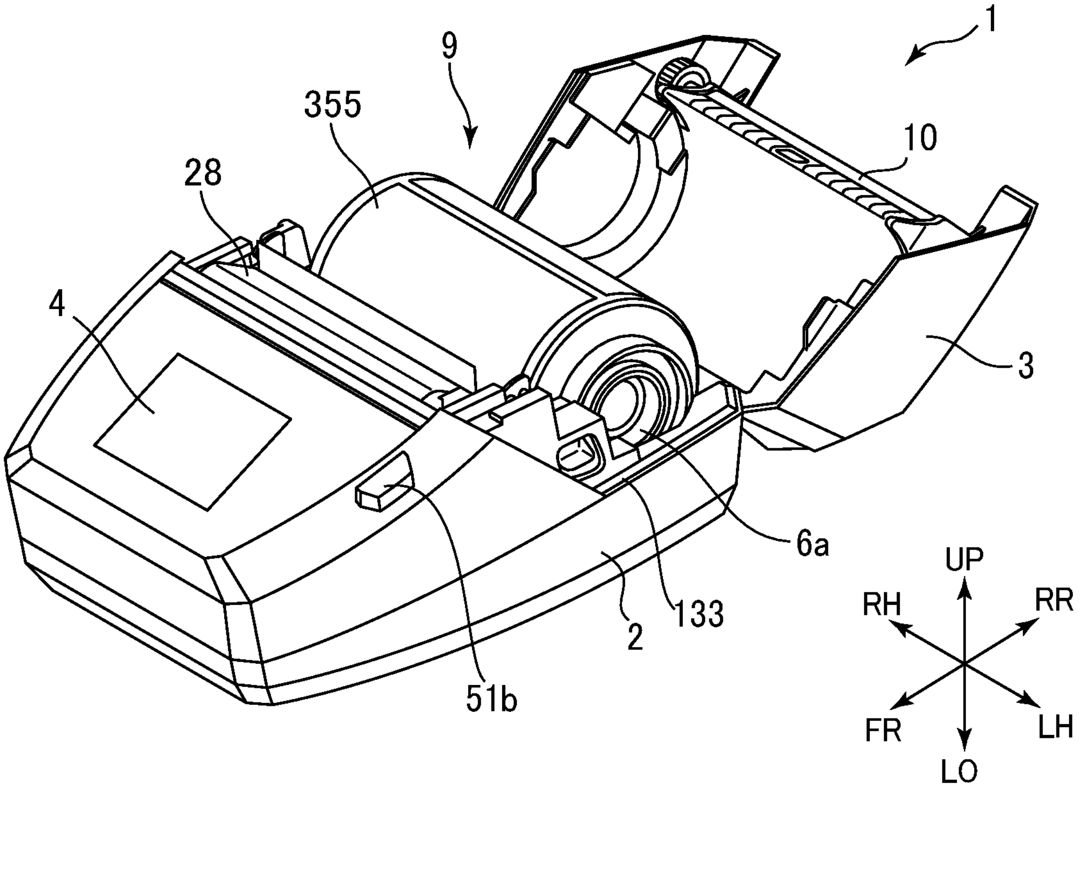
FIG. 1B is a perspective view of the printer according to an embodiment showing its front, left, and upper faces with its printer cover closed.
Figure 2:
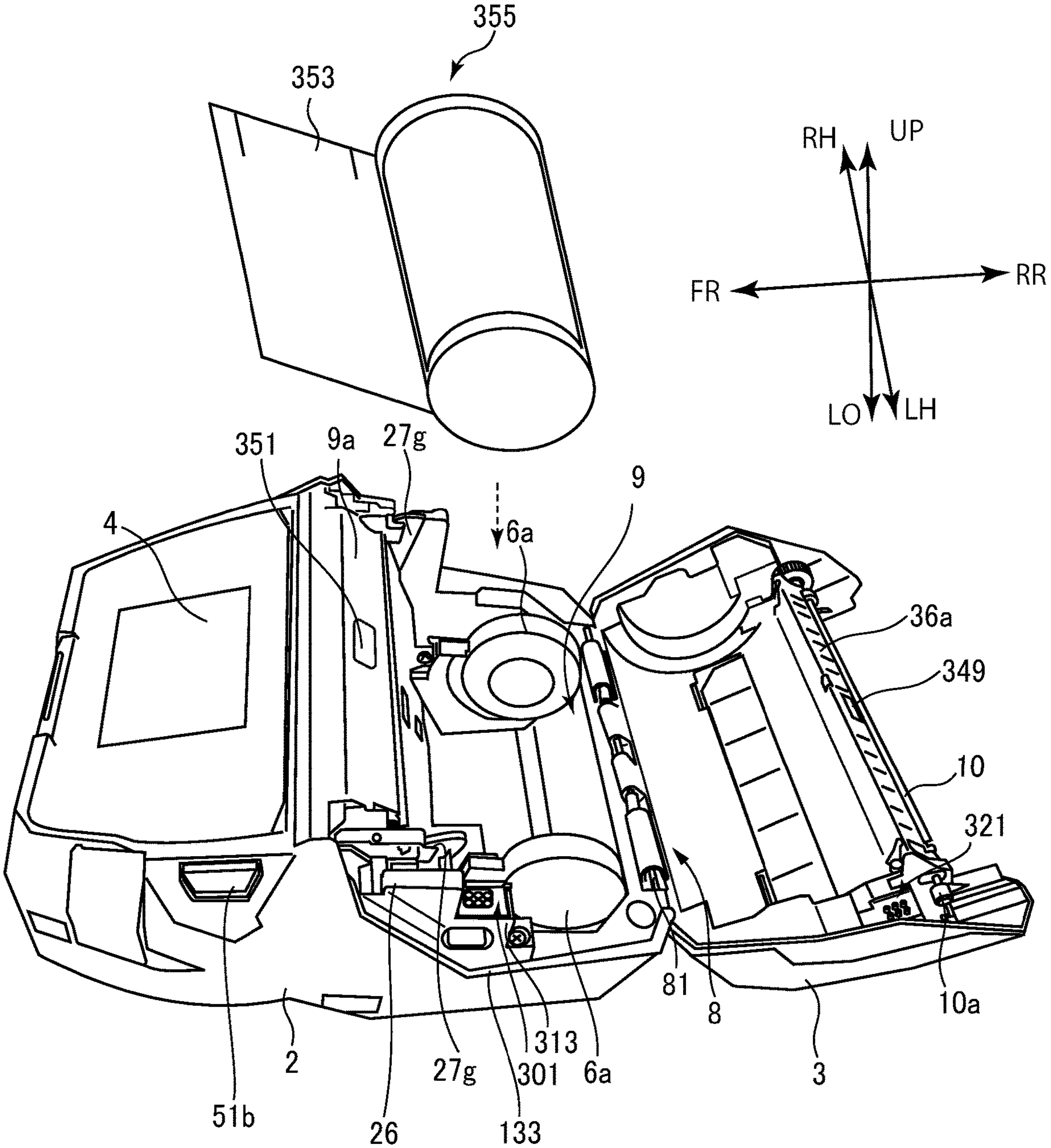
FIG. 2 is a perspective view of the printer according to an embodiment showing its left and upper faces with its printer cover open.

As shown in FIGS. 1A, 1B, and 2, the printer 1 according to the present embodiment includes a body case 2, a printer cover 3, a display panel 4, a platen roller 10, and a thermal head 28 (an example of a "print head" of the present invention).

For example, as shown in FIG. 1A, an outer bottom surface 131 of the printer 1 (see FIG. 4: an example of a printer bottom surface) is substantially rectangular, and the direction along its long side is defined as the front-rear direction. That is, it is defined that the side with the display panel 4 is the front (FR) and the opposite printer cover side is the rear (RR). A right side (RH), a left side (LH), a top side (UP), and a bottom side (LO) are defined relative to the front-rear direction. In the following description, as appropriate, the right (RH) or left (LH) direction is referred to as the lateral direction, and the top (UP) or bottom (LO) direction is referred to as the top-bottom direction.

As shown in FIG. 2, the printer 1 may include a roll body accommodating chamber 9 for accommodating a roll body 355, into which a continuous sheet (an example of a "print medium" of the present invention) 353 is wound. The body case 2 may include an inner bottom surface 2*a* (see FIG. 3) for the roll body 355 to be placed on. The continuous sheet 353 includes a mount and a plurality of labels tentatively attached to the mount.

The printer cover 3 is a cover that opens or shuts off the inside of the printer 1. A hinge 8, including a hinge shaft 81, is provided at the rear end of the printer cover 3. The hinge 8 rotatably holds the printer cover 3 to be rearwardly openable relative to the body case.

As will be described later, the hinge 8 is slidable in the front-rear direction.

The display panel 4 functions as an input/output interface for the user, and is a liquid crystal display panel with the touchscreen function, for example.

Figure 3:
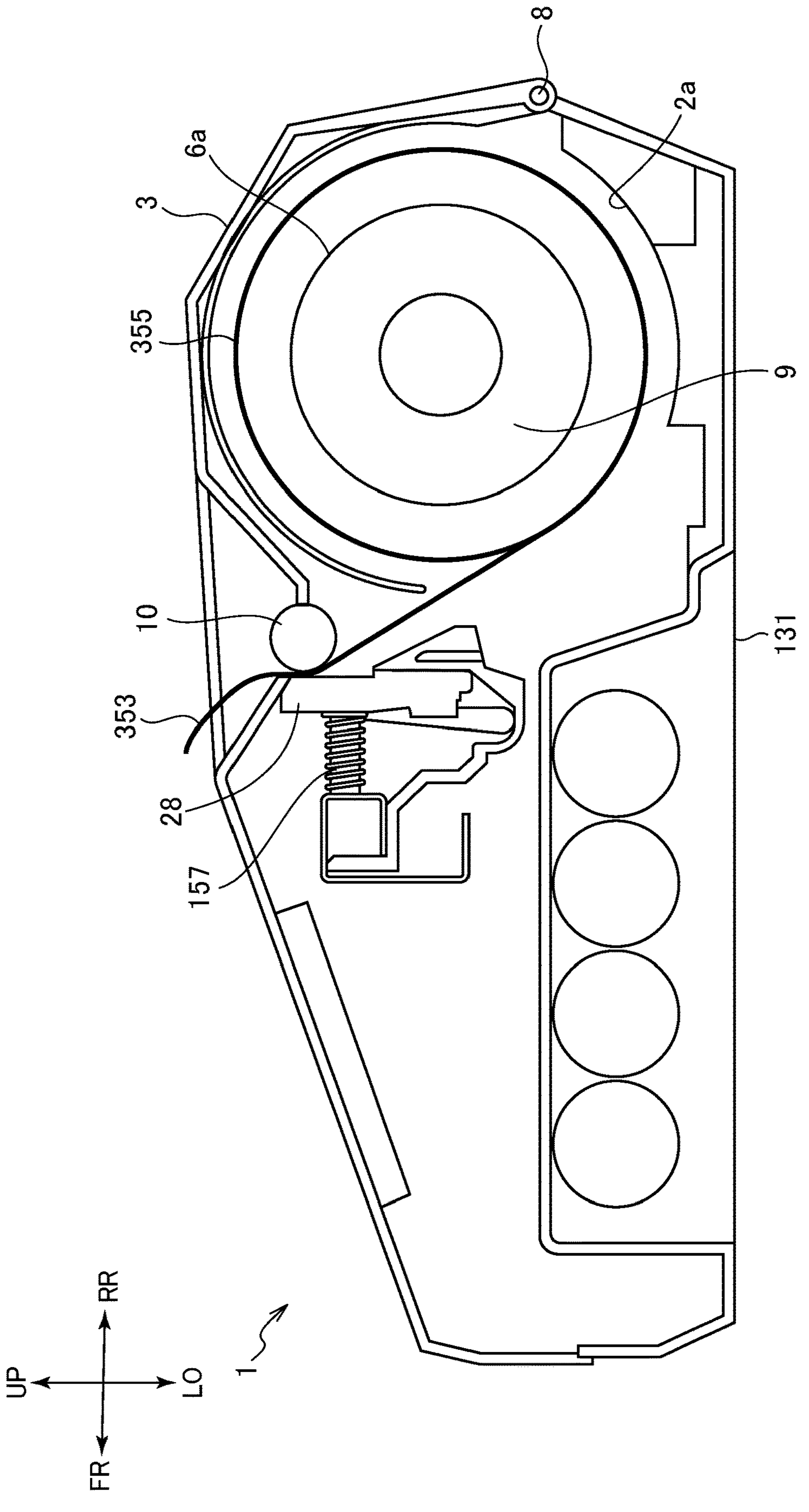
FIG. 3 is a side sectional view of the printer according to an embodiment.

As shown in FIG. 2, a platen roller 10 is provided at the tip side of the printer cover 3, opposite to the side where the hinge 8 is, to be rotatable in the forward and reverse directions. As shown in FIG. 3, when the printer cover 3 is closed, the platen roller 10 is disposed behind the thermal head 28.

The platen roller 10 is conveying means for conveying the continuous sheet 353 drawn out of the roll body 355, which is accommodated in the roll body accommodating chamber 9 while retained by a pair of roll body guides 6*a*. The platen roller 10 extends along the width direction of the roll body 355. The platen roller 10 is mechanically coupled to a stepping motor (not shown) or the like to be driven.

The thermal head 28 is printing means that prints information such as characters, symbols, graphics, or barcodes on the continuous sheet 353 drawn out of the roll body 355. As shown in FIG. 3, when the printer cover 3 is closed, the printing surface of the thermal head 28 faces the feed route of the continuous sheet 353 and is opposed to the platen roller 10. A plurality of heat elements (not shown) that generate heat when energized are arranged on the printing surface of the thermal head 28 along the width direction of the continuous sheet 353. The thermal head 28 is connected to a circuit board (not shown) that transmits printing signals to the thermal head 28.

On the back side of the thermal head 28, a coil spring 157 as a biasing member is provided for providing biasing force to the thermal head 28.

When the printer cover 3 is closed and printing is carried out, the continuous sheet 353 is pinched between the platen roller 10 and the thermal head 28 while conveyed by the platen roller 10. Here, the thermal head 28 is pressed against the platen roller 10 with the biasing force, thereby generating a head pressure suitable for printing.

(2) Body Case

Around the roll body accommodating chamber 9 in the rear half of the printer 1, the body case 2 includes a portion that covers the lower half space of the roll body accommodating chamber 9 on the right and left sides and from behind and below, and a portion that covers the space accommodating mechanisms and circuitry in the front half of the printer 1 on the right and left sides and from the front, below, and above.

(3) Printer Cover

Around the roll body accommodating chamber 9, the printer cover 3 covers the upper half space of the roll body accommodating chamber 9 on the right and left sides and from behind and above.

The printer cover 3 can be opened and closed about the rotary shaft of the hinge 8 between the closed position shown in FIG. 1A and the open position at the maximum open angle shown in FIG. 1B. Here, the maximum open angle refers to an angle at which the printer cover 3 cannot further be rotated by cover-side buffer members 151 (see FIGS. 4 and 5) provided at a rear surface part 123 of the printer cover 3. At the maximum open angle, the cover-side buffer members 151 abut on body-side buffer members 141 (see FIGS. 4 and 5) provided at a rear surface part 121 of the body case 2.

Figure 7:
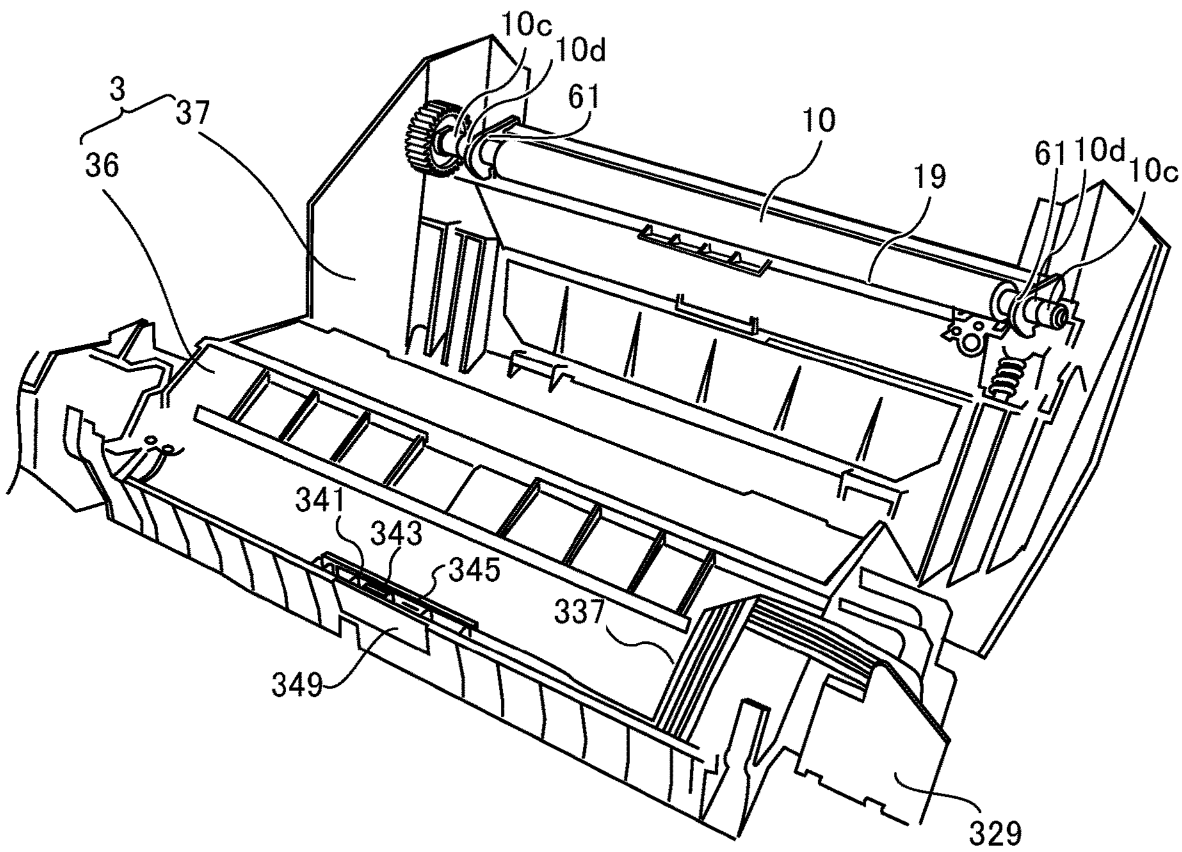
FIG. 7 is a perspective view of the printer according to an embodiment showing its inner and outer printer covers.

In an embodiment, as shown in FIG. 7, the printer cover 3 has a two-layer structure made up of an inner printer cover 36 and an outer printer cover 37 in view of strength. The present invention is not limited to such a structure.

(4) Platen Roller

As shown in FIG. 7, when the outer printer cover 37 and the inner printer cover 36 are separated from each other, the platen roller 10 can be held on a tentative-retaining part 19 provided at the outer printer cover 37. A pair of shaft-supporting members 61 are provided at the both ends of a platen shaft 10*a*.

Figure 8:
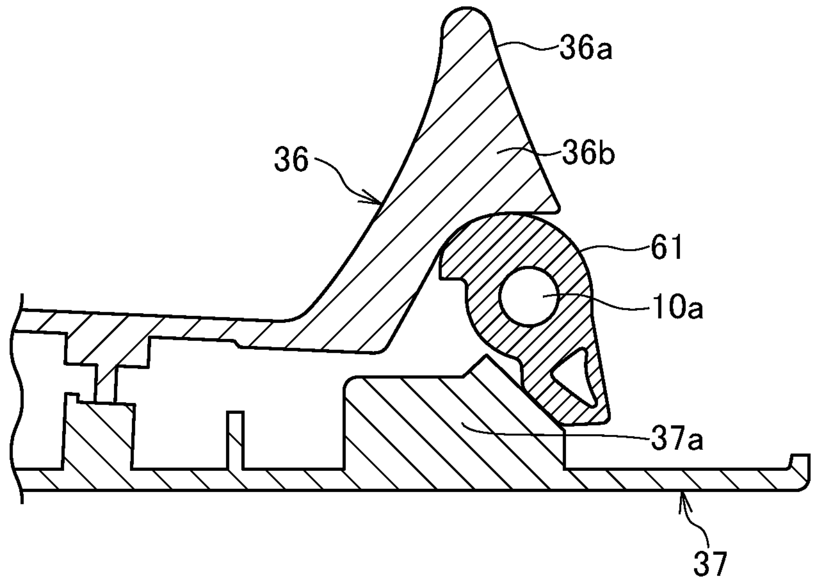
FIG. 8 is a cross-sectional view of the printer according to an embodiment in which shaft-supporting members receiving a platen shaft are held between the inner printer cover and the outer printer cover.

FIG. 8 shows a cross section, perpendicular to the platen shaft 10*a*, of the printer cover 3 in which the outer printer cover 37 and the inner printer cover 36 are integrated by being screwed to each other at the shaft-supporting members 61.

As shown in FIG. 8, the pair of shaft-supporting members 61 are each interposed between a shaft-supporting member retaining part 37*a* provided on the inner side of the outer printer cover 37 and a shaft-supporting member retaining part 36*b* provided on the outer side of the inner printer cover 36. Thus, when the outer printer cover 37 and the inner printer cover 36 are screwed to each other to be the integrated printer cover 3, the platen shaft 10*a* is rotatably fixed to the printer cover 3.

(5) Platen Shaft Retaining Portions

As shown in FIG. 2, the body case 2 includes a pair of platen shaft retaining portions 26. The pair of platen shaft retaining portions 26 are provided at substantially the right and left ends (one example of a second position) for retaining the platen shaft 10*a* at the tip of the printer cover 3 when the printer cover 3 is at the closed position. The platen shaft retaining portions 26 are formed at the body frame of the body case 2.

Specifically, the pair of platen shaft retaining portions 26 respectively rotatably retain a pair of first retained portions 10*c* (see FIG. 7; an example of a second portion of the platen roller) at substantially the right and left ends of the platen shaft 10*a* when the printer cover 3 is at the closed position.

Figure 15:
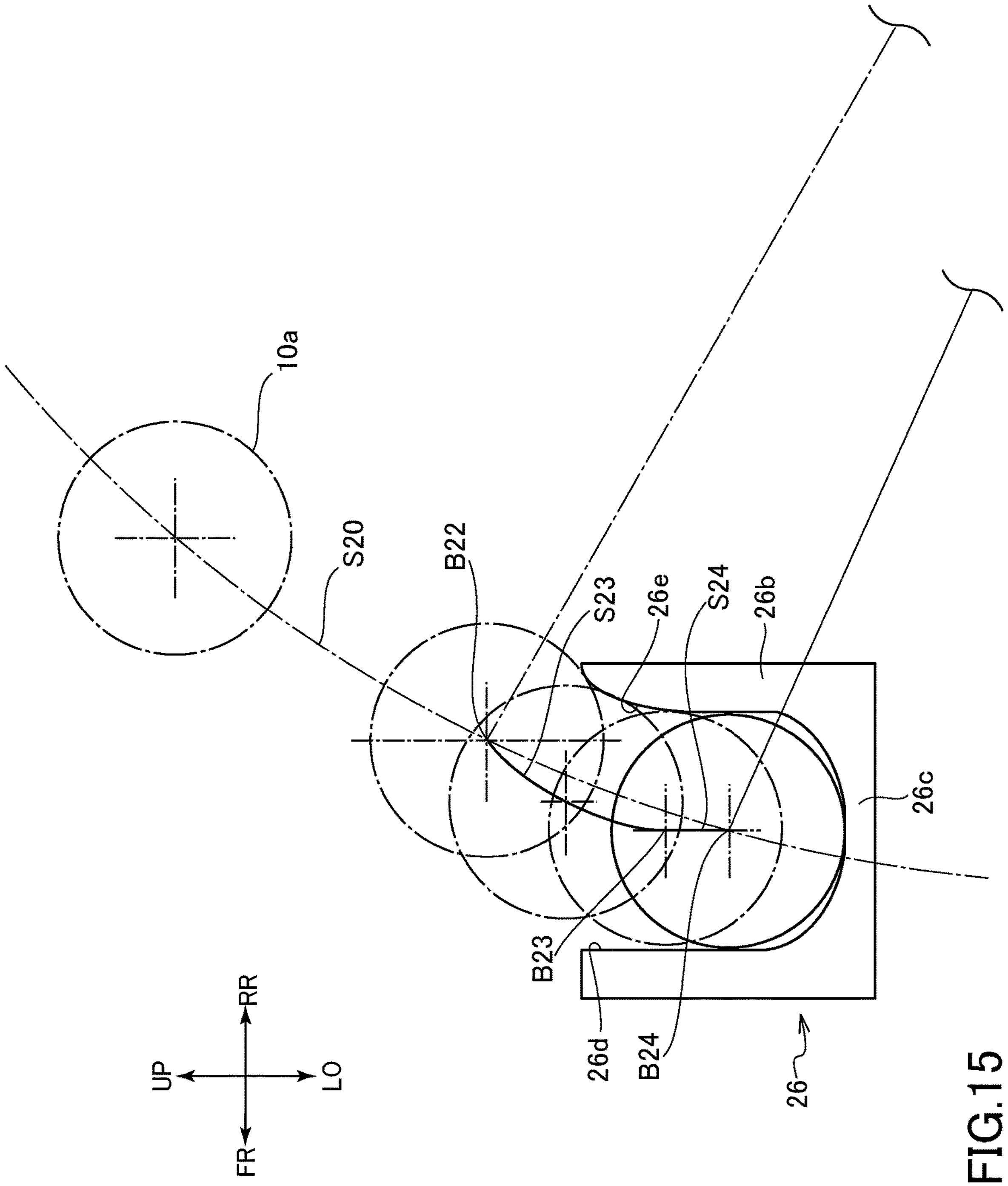
FIG. 15 shows the circular-motion locus of the platen shaft retaining portions and the platen shaft of the printer according to an embodiment.

As shown in FIG. 15, particularly, front end surfaces and rear end surfaces of the first retained portions 10*c* of the platen shaft 10*a* abut on vertical surfaces of a front wall 26*d* and a rear wall 26*e* of each of the platen shaft retaining portions 26. This restricts the platen shaft 10*a* from shifting in the front-rear direction. The vertical surfaces may be surfaces perpendicular to the outer bottom surface 131. However, the surfaces formed at the front wall 26*d* and the rear wall 26*e* are not specified to the vertical surfaces, and may be any surfaces that are opposed to each other for retaining the first retained portions 10*c* of the platen shaft 10*a*.

Figure 9:
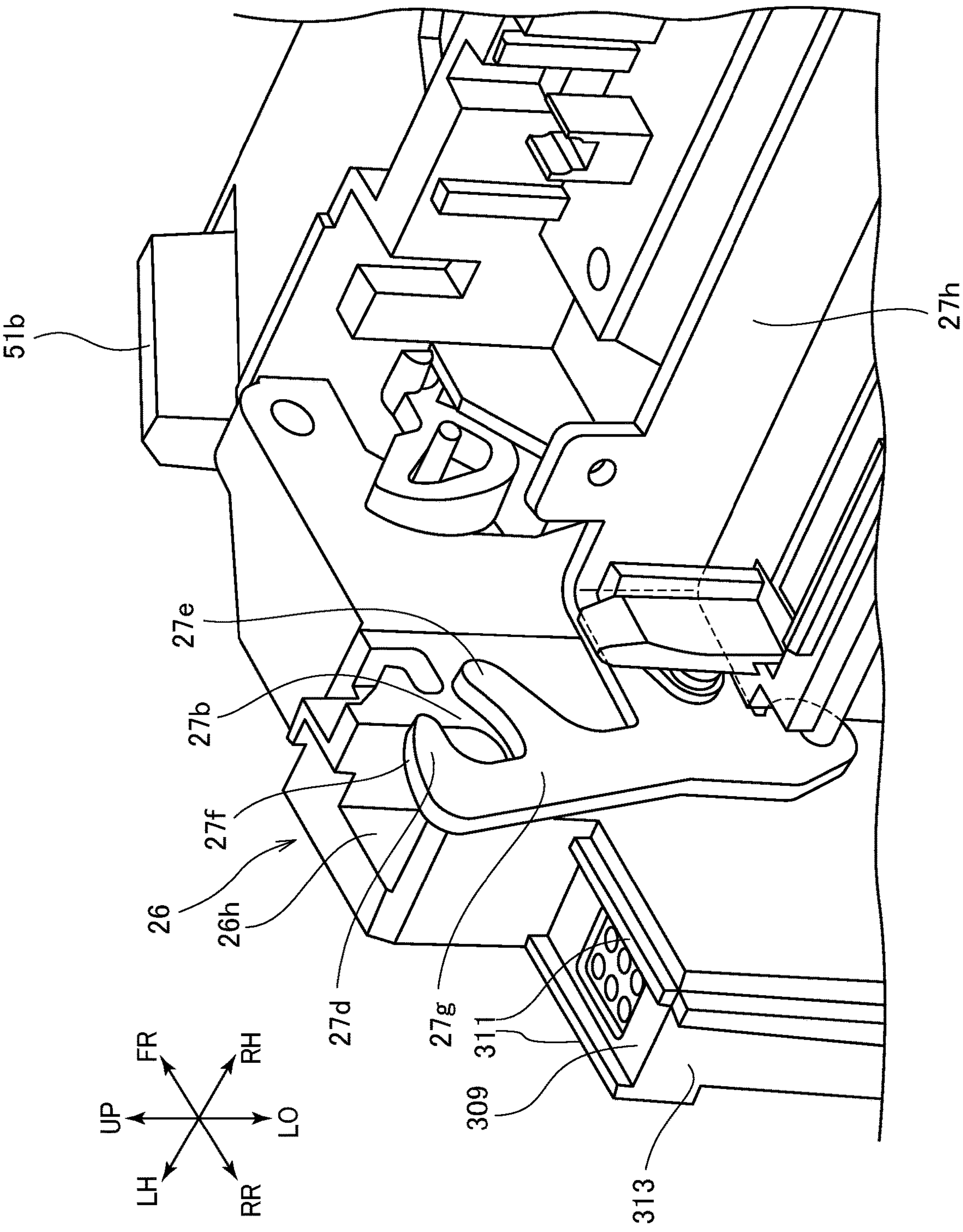
FIG. 9 is a perspective view of the printer according to an embodiment showing its body-side connector, platen shaft retaining portions, platen retaining bracket and their surroundings.

FIG. 9 is a perspective view of the printer 1 showing the platen shaft retaining part 26 provided substantially at the right end of the body case 2.

(6) Platen Retaining Bracket

Figure 10:
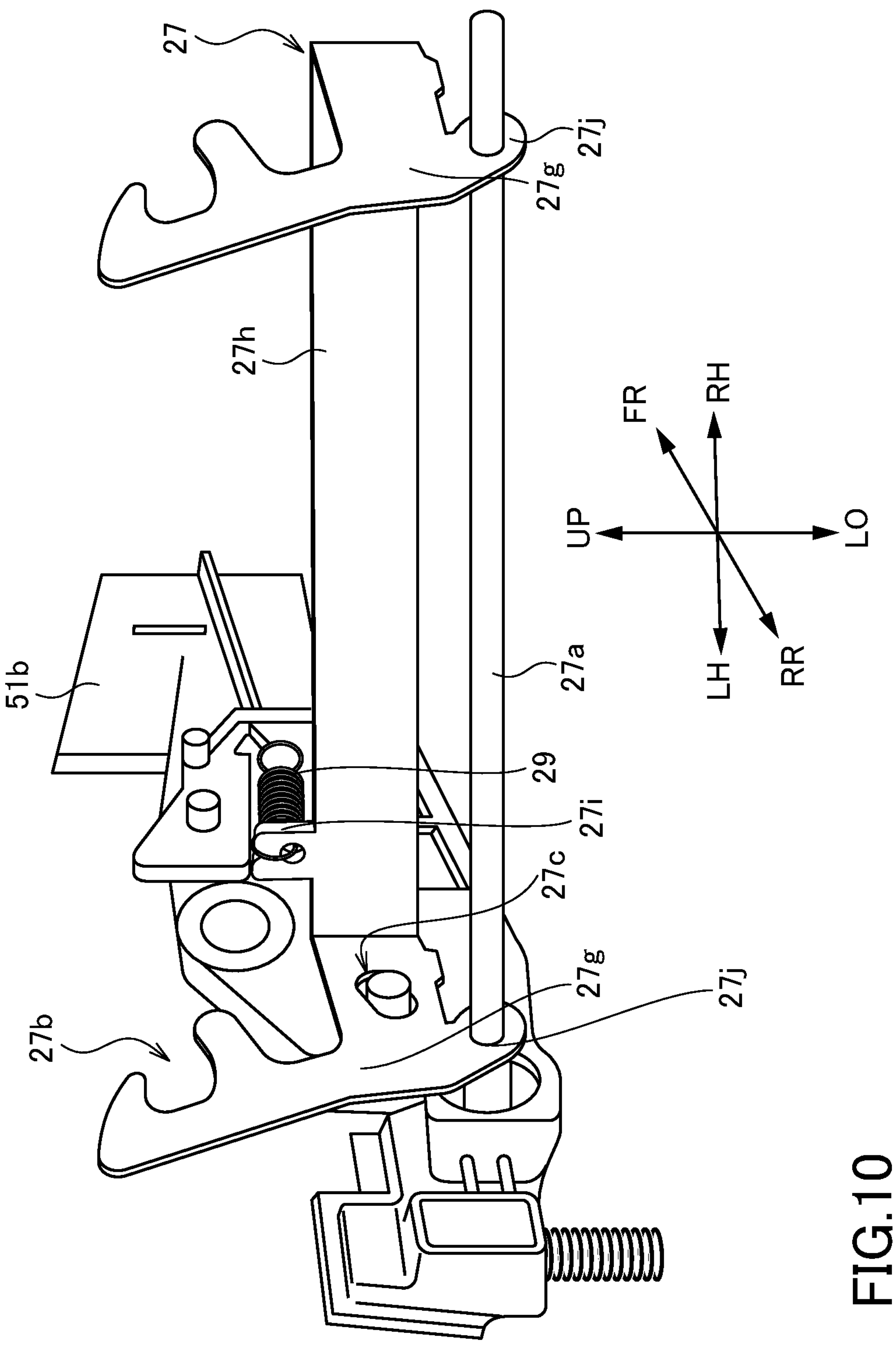
FIG. 10 is a perspective view of the printer according to an embodiment showing its platen retaining bracket and its surroundings.

As shown in FIG. 2, a pair of arms 27*g* (an example of a platen retaining part) are provided at substantially the right and left ends of a platen retaining bracket 27. As shown in FIG. 10, the platen retaining bracket 27 includes the pair of arms 27*g* and a beam 27*h* coupling them to each other. The beam 27*h* includes a hook 27*i* for suspending a coil spring 29. The pair of arms 27*g* include holes 27*j* for a rotary shaft 27*a* to pass through. While not shown in the drawings, the rotary shaft 27*a* is inserted through the body frame of the body case 2.

Accordingly, the platen retaining bracket 27 can rotate so that the pair of arms 27*g* tilt in the front-rear direction about the rotary shaft 27*a*. Here, the coil spring 29 biases the platen retaining bracket 27 in a direction in which the pair of arms 27*g* tilt frontward (a direction toward which an elevation angle θ becomes smaller (see FIG. 11)).

Figure 11:
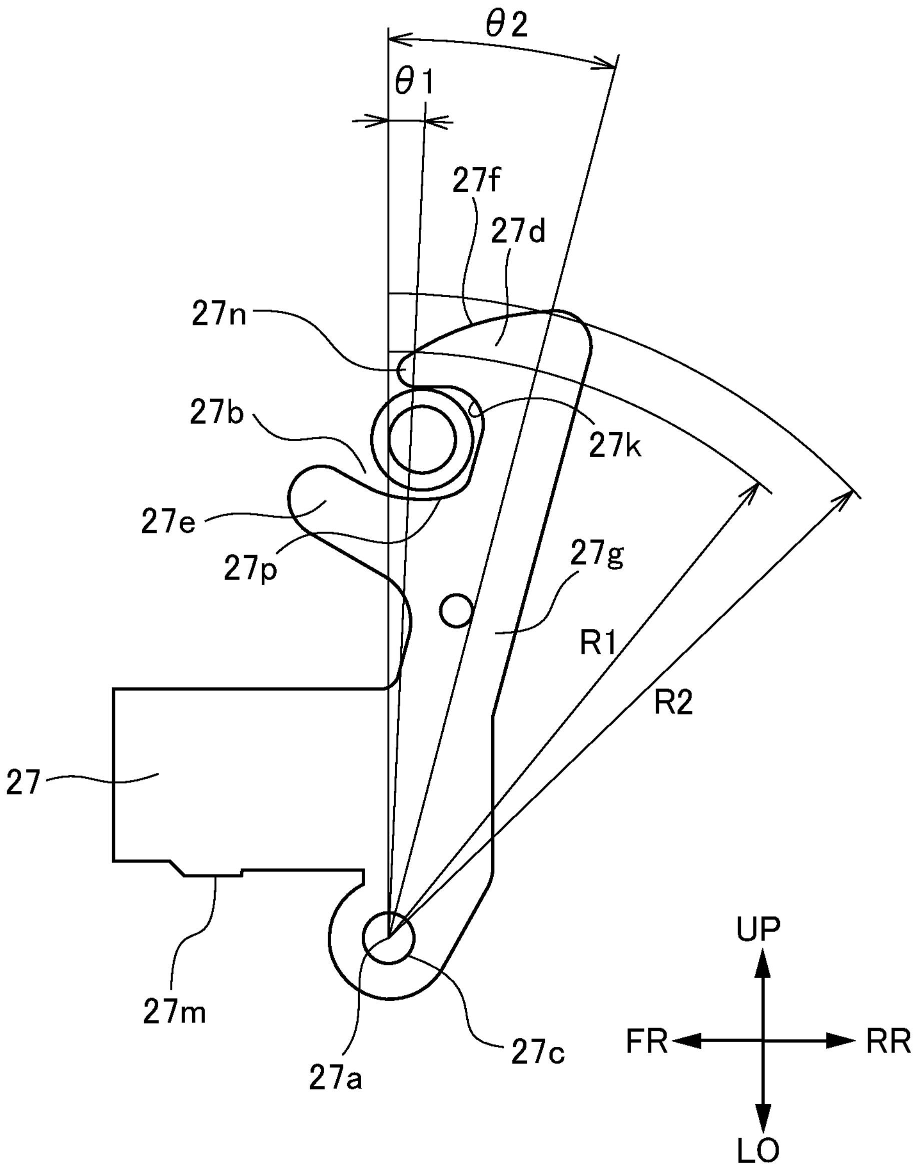
FIG. 11 is a side view of the printer according to an embodiment showing its arms of the platen retaining bracket and their surroundings.

As shown in FIG. 11, each arm 27*g* includes an upper holding portion 27*d* and a lower holding portion 27*e* in an order from the far side of distance from the rotary shaft 27*a*. A holding portion groove 27*b* is formed between the upper holding portion 27*d* and the lower holding portion 27*e*.

As shown in FIG. 9, the right platen shaft retaining part 26 is provided at substantially the right end of the body case 2. The right arm 27*g* is provided adjacent to and toward the center than the right platen shaft retaining part 26. Similarly, while not shown, the left platen shaft retaining part 26 is provided at substantially the left end. The left arm 27*g* is provided adjacent to and toward the center than the left platen shaft retaining part 26.

Figure 12:
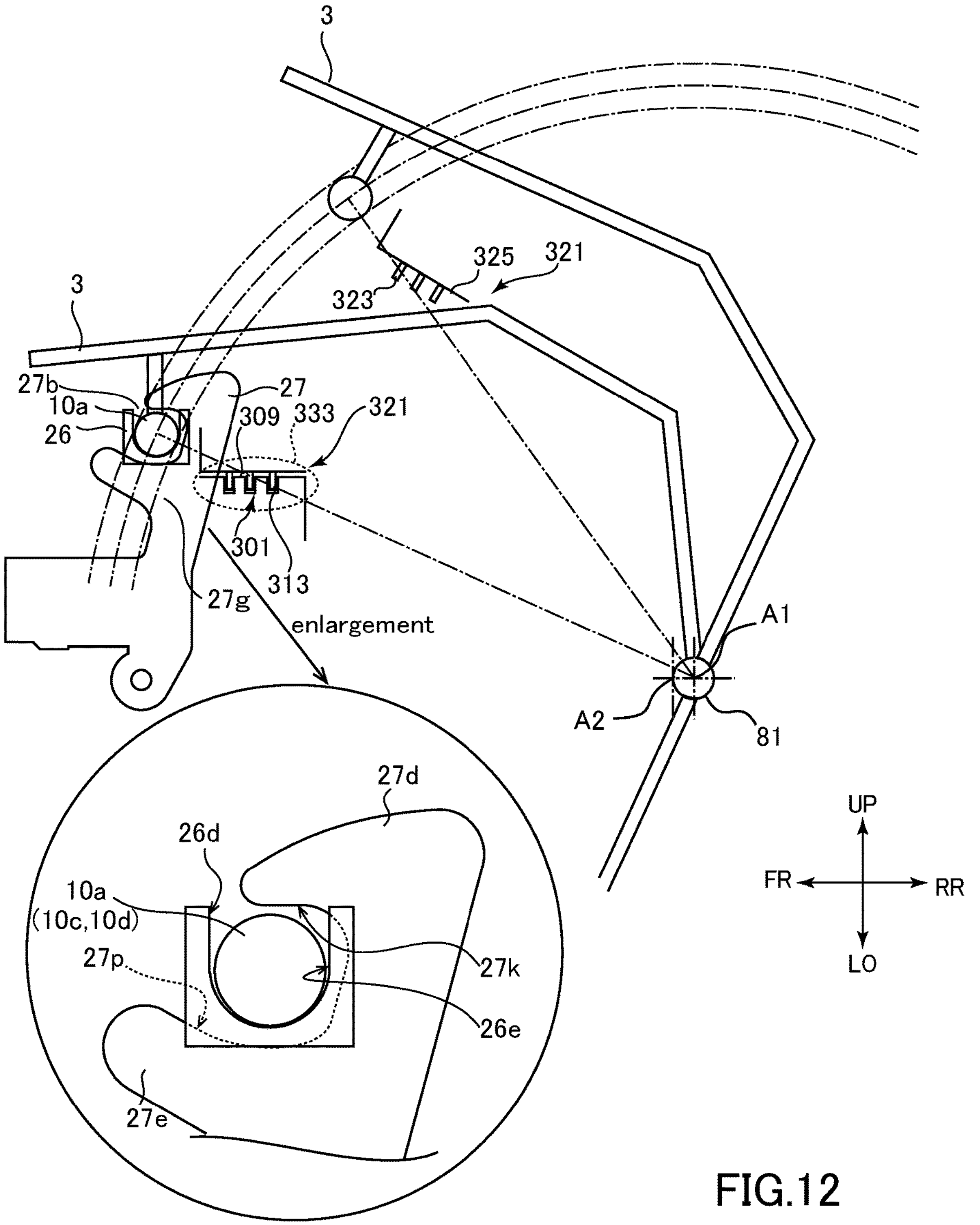
FIG. 12 is a side view of the printer according to an embodiment showing its printer cover, its platen shaft, its arms, and its platen shaft retaining portions.

As shown in FIG. 12, when the printer cover 3 is at the closed position, a lower surface (an upward-displacement preventing surface) 27*k* of the upper holding portion 27*d* of each arm 27*g* of the platen retaining bracket 27 is in contact with the upper end surface of a portion as a second retained portion 10*d* (see FIG. 7; an example of a first portion of the platen roller) of the platen shaft 10*a*. When the printer cover 3 is at the closed position, an upper surface (a downward-displacement preventing surface) 27*p* of the lower holding portion 27*e* of each arm 27*g* of the platen retaining bracket 27 is in contact with the lower end surface of the portion as the second retained portion 10*d* (see FIG. 7) of the platen shaft 10*a*. Accordingly, when the printer cover 3 is at the closed position, the upward-displacement preventing surface 27*k* and the downward-displacement preventing surface 27*p* restrict the second retained portions 10*d* of the platen shaft 10*a* from shifting in the top-bottom direction.

That is, in FIG. 12, there are provided a pair of surfaces (namely, the upward-displacement preventing surface 27*k* and the downward-displacement preventing surface 2'7*p*) for restricting the clockwise and counterclockwise circular movement of the second retained portions 10*d* of the platen roller 10 upon the swinging movement of the printer cover 3. The upper holding portion 27*d*, the lower holding portion 27*e*, and the holding portion groove 27*b* prevent the platen roller 10 from swinging and shifting by a predetermined distance or longer from an engaged position (a position Q (xl, yl, zl), which will be described later). Thus, the platen roller 10 is surely retained.

Figure 13:
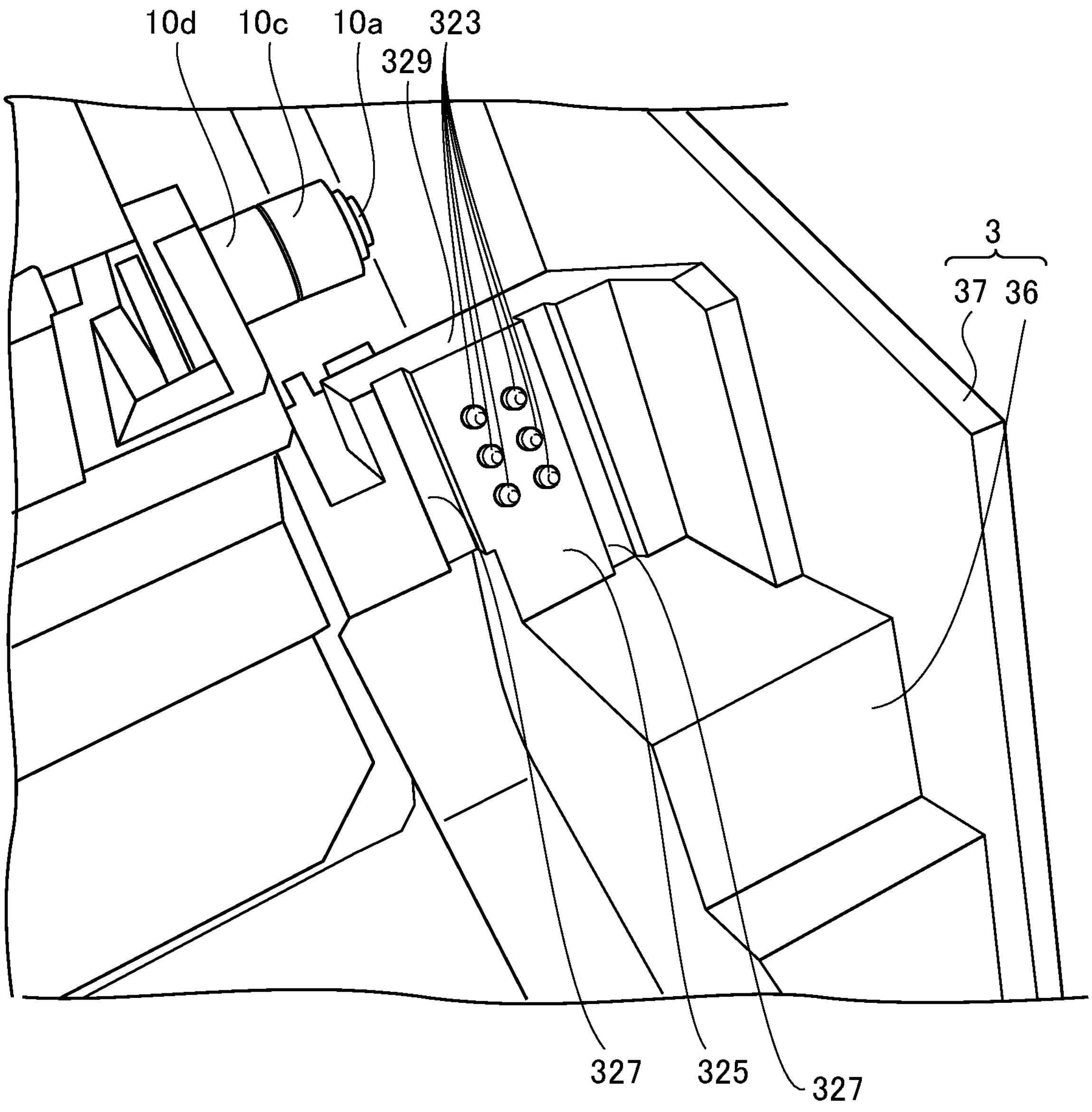
FIG. 13 is a perspective view of the printer according to an embodiment showing the inner surfaces of its inner and outer printer covers, its cover-side connector, and its platen shaft.

With reference to FIG. 13, a first retained portion 10*c* is located near one end of the platen shaft 10*a* and the corresponding second retained portion 10*d* is farther from the end (i.e., nearer to the center). The vertical surfaces of the front wall 26*d* and rear wall 26*e* of the platen shaft retaining part 26 abut on the corresponding first retained portion 10*c*. The upward-displacement preventing surface 27*k* and the downward-displacement preventing surface 2'7*p* are in contact with the corresponding second retained portion 10*d*. The same applies to the other end of the platen shaft 10*a*.

Accordingly, as shown in an enlarged manner in FIG. 12, when the printer cover 3 is at the closed position, the shift of the platen shaft 10*a* is limited from four sides by four surfaces, namely, the vertical surface of the front wall 26*d* and the vertical surface of the rear wall 26*e* of each platen shaft retaining part 26, and the upward-displacement preventing surface 27*k* and the downward-displacement preventing surface 2'7*p* of the platen retaining bracket 27.

When the printer cover 3 is at the open position, an elevation angle θ of the arms 27*g* is a minimum elevation angle θ1 (see FIG. 11). During the shifting of the printer cover 3 from the open position toward the closed position, the platen shaft 10*a* abuts on the upper surface 27*f*. When the printer cover 3 is further brought closer to the closed position, since the upper surface 27*f* inclined relative to the radial direction of the arms 27*g* is pushed by the platen shaft 10*a*, the elevation angle θ of the arms 27*g* becomes gradually greater. When the platen shaft 10*a* passes through tips 27*n* of the arms 27*g*, the elevation angle θ of the arms 27*g* becomes a maximum elevation angle θ2. When the printer cover 3 is further brought closer to the closed position, the platen shaft 10*a* gradually shifts to be located under the tips 27*n* of the arms 27*g*, and the arms 27*g* rotate by the biasing force of the coil spring 29 in the direction in which the elevation angle θ decreases while maintaining the contact between the platen shaft 10*a* and the tips 27*n*. When the platen shaft 10*a* shifts to be located under the upward-displacement preventing surface 27*k*, the elevation angle θ of the arms 27*g* becomes the minimum elevation angle θ1. At this time, the platen shaft 10*a* is restricted from shifting upward by the upward-displacement preventing surface 27*k* and from shifting downward by the downward-displacement preventing surface 27*p*. In this state of the platen shaft 10*a*, the platen shaft 10*a* is locked by the arms 27*g* and the printer cover 3 is closed at the closed position.

In order to cancel the lock, the user operates a cover releasing button 51*b* so that the arms 27*g* swing to increase the elevation angle θ of the arms 27*g* against the resilience of the coil spring 29. Thus, due to the biasing force of the hinge 8, the printer cover 3 swings toward the open position and the platen shaft 10*a* is released from the holding portion groove 27*b*.

(7) Hinge

Figure 4:
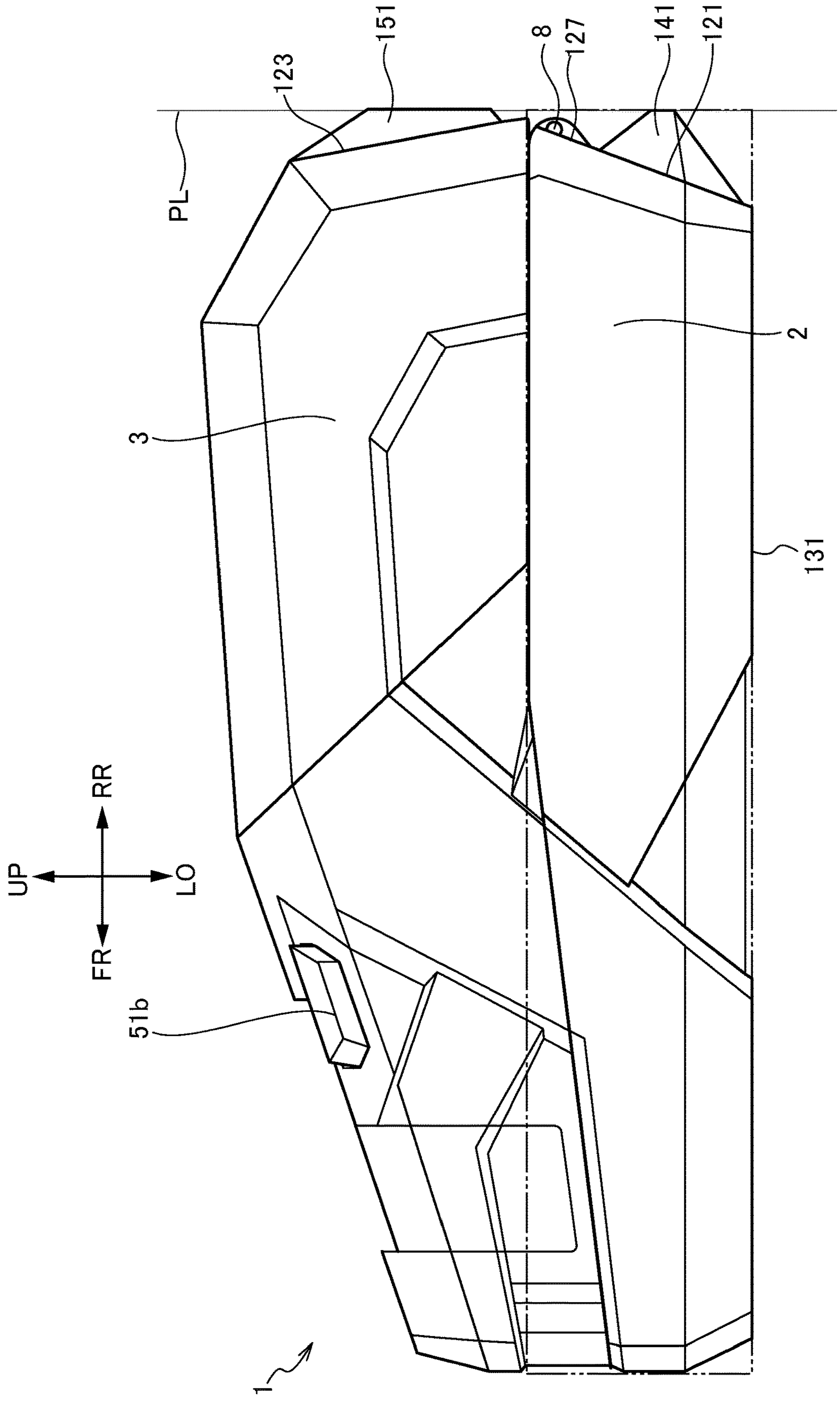
FIG. 4 is a side view of the printer according to an embodiment.
Figure 5:
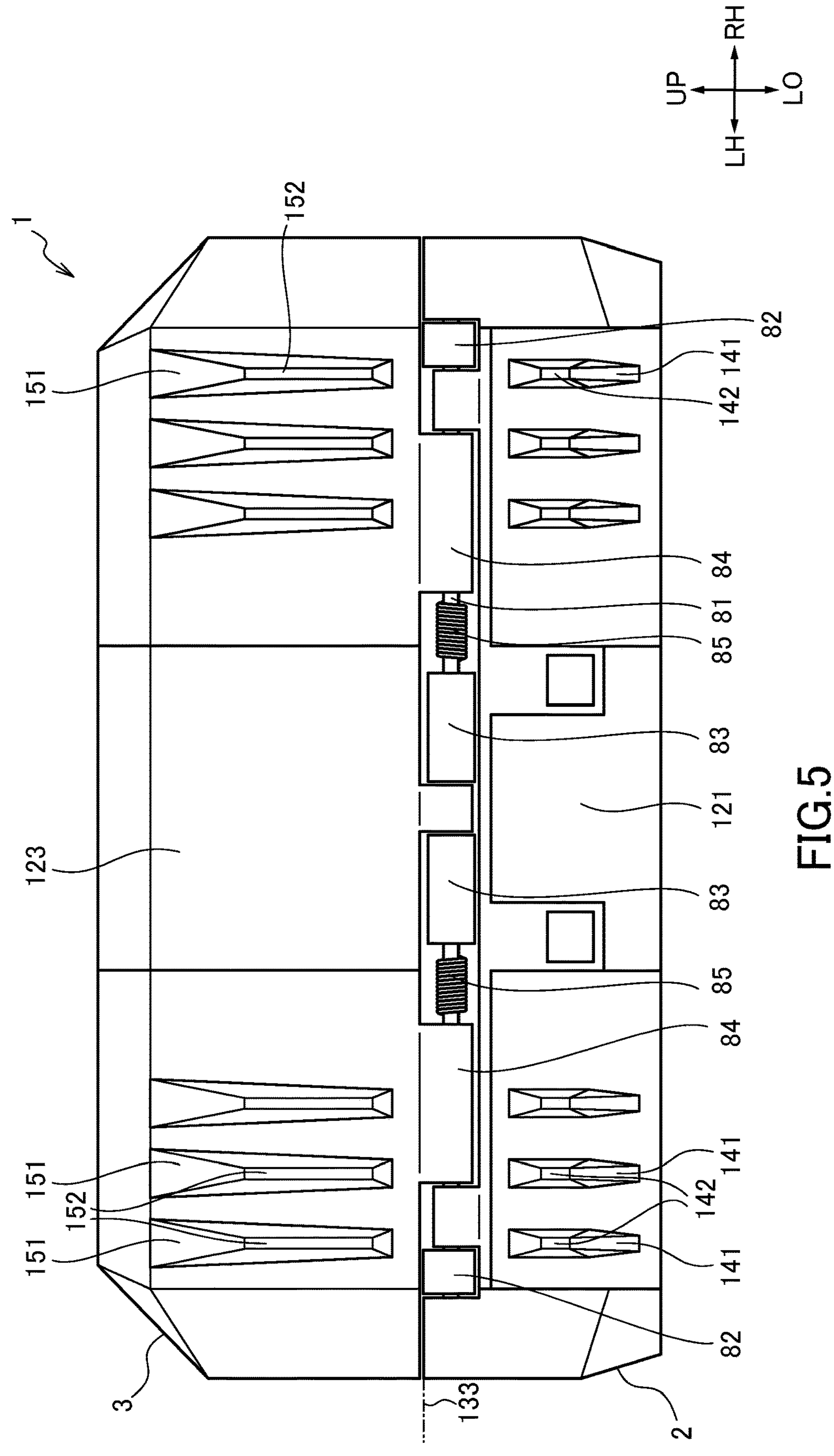
FIG. 5 is a rear view of the printer according to an embodiment.

As shown in FIGS. 4 and 5, the hinge 8 extends in the lateral direction at an upper peripheral portion 127 of the rear surface part 121 of the body case 2.

Figure 14:
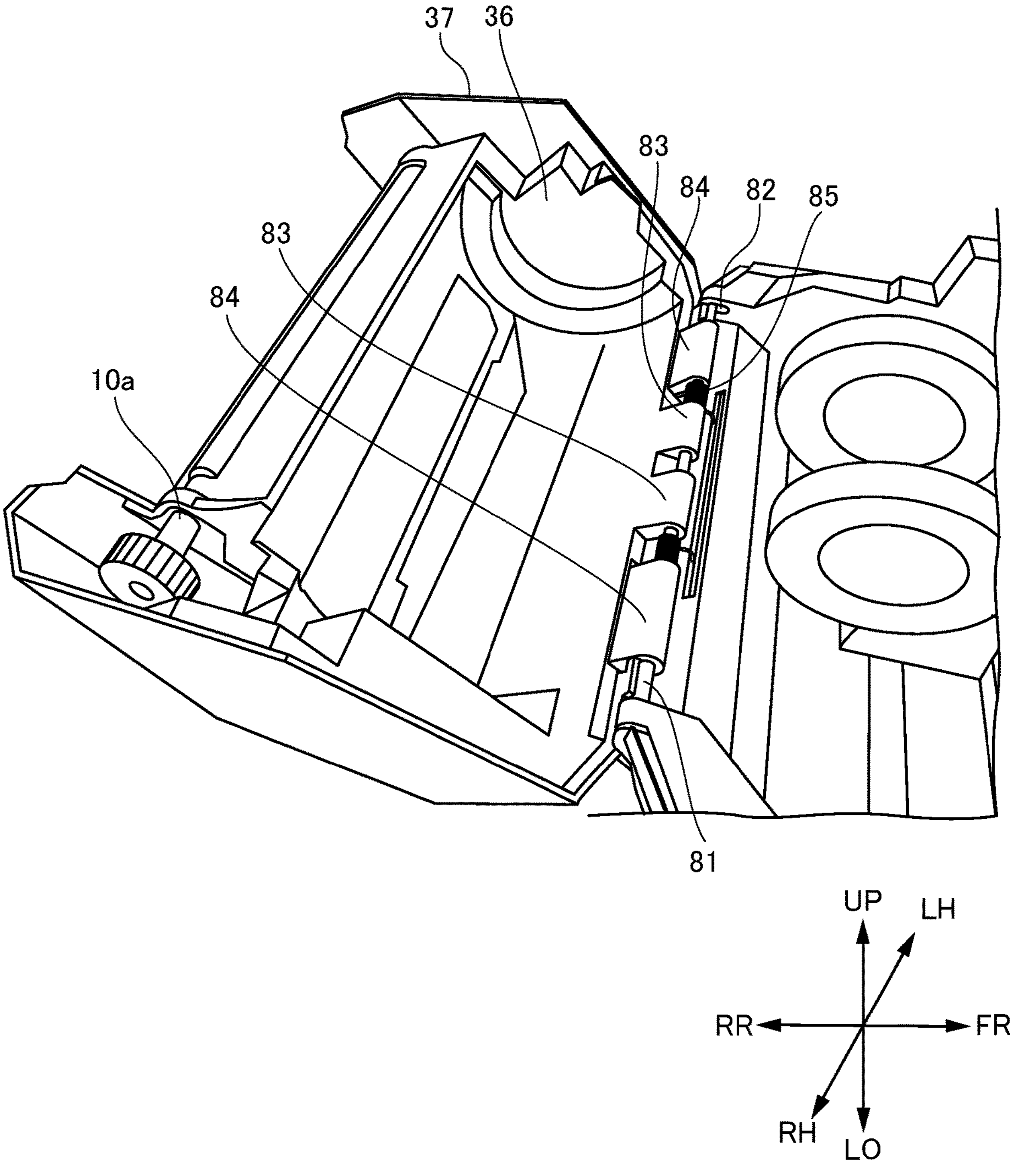
FIG. 14 is a perspective view of the printer according to an embodiment showing the rear end part of its body, its printer cover and its hinge.

A lower peripheral portion 129 of the rear surface part 123 of the printer cover 3 is coupled via the hinge 8 to the upper peripheral portion 127 of the rear surface part 121 of the body case 2 so that the hinge 8 allows the printer cover 3 to open and close As shown in FIG. 14, the hinge 8 includes the hinge shaft 81, body-side shaft-supporting long holes 82, inner printer cover-side shaft-supporting round holes 83, outer printer cover-side shaft-supporting round holes 84, and a torsion spring 85.

The pair of body-side shaft-supporting long holes 82 are provided at the right and left ends near the rear end of the roll body accommodating chamber 9. The body-side shaft-supporting long holes 82 have a long axis in the front-rear direction. Here, the long axis direction of the body-side shaft-supporting long holes 82 may be slightly displaced from the front-rear direction.

The pair of inner printer cover-side shaft-supporting round holes 83 are provided at the rear end of the inner printer cover 36.

The pair of outer printer cover-side shaft-supporting round holes 84 are provided at the rear end of the outer printer cover 37.

The hinge shaft 81 is inserted through the pair of inner printer cover-side shaft-supporting round holes 83 and the pair of outer printer cover-side shaft-supporting round holes 84. The hinge shaft 81 has its both ends inserted into the pair of body-side shaft-supporting long holes 82.

The hinge shaft 81 (an example of a rotary shaft) extends in the lateral direction at the upper peripheral portion 127 (see FIG. 4) of the rear surface part 121 of the body case 2. Accordingly, the body-side shaft-supporting long holes 82, the inner printer cover-side shaft-supporting round holes 83, and the outer printer cover-side shaft-supporting round holes 84 are also provided at the upper peripheral portion 127 of the rear surface part 121 of the body case 2. Accordingly, in the printer cover 3, the inner printer cover-side shaft-supporting round holes 83 and the outer printer cover-side shaft-supporting round holes 84 are positioned lower than the horizontal boundary line 133 (see FIG. 5) between the body case 2 and the printer cover 3.

In operation, the inner printer cover 36 and the outer printer cover 37 are integrated by being screwed to each other. When the inner printer cover 36 and the outer printer cover 37 are screwed to each other, the inner printer cover 36 and the outer printer cover 37 can rotate about the hinge shaft 81 while being integrated. On the other hand, when the inner printer cover 36 and the outer printer cover 37 are not screwed to each other, they can separately rotate about the hinge shaft 81. FIG. 2 shows the inner printer cover 36 and the outer printer cover 37 integrated by being screwed to each other. FIG. 7 shows the inner printer cover 36 and the outer printer cover 37 not screwed but separate from each other.

Accordingly, when the hinge shaft 81 slides in the front-rear direction, the integrated inner printer cover 36 and the outer printer cover 37 slide together in the front-rear direction. That is, when the hinge shaft 81 slides in the front-rear direction, the printer cover 3 slides in the front-rear direction.

The integrated inner printer cover 36 and outer printer cover 37 can rotate together about the hinge shaft 81. That is, the printer cover 3 can rotate about the hinge shaft 81.

The torsion spring 85 biases the printer cover 3 to open the printer cover 3 in the closed state.

The body-side shaft-supporting long holes 82 whose long axes are elongated in the front-rear direction allows the hinge shaft 81 of the hinge shaft 81 to slide in the front-rear direction. That is, the hinge shaft 81 can slide in the direction perpendicular to the hinge shaft 81 within a horizontal plane.

FIG. 15 shows the motion of the platen shaft 10*a* when the printer cover 3 is closed. In FIG. 15, positions B22, B23, and B24 correspond to the center position of the platen shaft 10*a*, and loci S20, S23, and S24 correspond to the locus of the center position of the platen shaft 10*a*.

With reference to FIG. 15, when the hinge shaft 81 is at the position A1 at the rear end (see FIG. 12) (i.e., when the hinge shaft 81 is at the rear end of the body-side shaft-supporting long holes 82), in a process of the printer cover 3 transitioning from the open state to the closed state, the platen shaft 10*a* moves in a circular motion through the locus S20 in accordance with the swing of the printer cover 3. At the position B22, the platen shaft 10*a* is brought into contact with the rear walls 26*e* of the platen shaft retaining portions 26. Thereafter, since the hinge shaft 81 is capable of sliding in the front-rear direction between the position A1 and the position A2 at the front end (see FIG. 12) in the body-side shaft-supporting long holes 82, the platen shaft 10*a* passes the locus S23 while keeping the contact with the rear walls 26*e* to reach the position B23. After reaching the position B23, the platen shaft 10*a* passes along the front walls 26*d* and the vertical surface of the rear walls 26*e* of the platen shaft retaining portions 26 to reach the position B24. When the platen shaft 10*a* is at the position B24, the platen shaft 10*a* substantially reaches bottom portions 26*c* and the printer cover 3 enters the closed state. Here, the first retained portions 10*c* of the platen shaft 10*a* are interposed and held between the vertical surfaces of the front walls 26*d* and the vertical surfaces of the rear walls 26*e*.

Immediately before the printer cover 3 enters the closed state, the platen shaft 10*a* moves straight in the top-bottom direction along the locus B24, and accordingly, a cover-side connector 321 attached to the printer cover 3 moves in the top-bottom direction with the platen shaft 10*a*. As a result, cover-side connector male terminals 323 of the cover-side connector 321 are straightly brought into contact with body-side connector female terminals 303 of a body-side connector 301, thereby significantly reducing risk of any contact failure.

Provided that the hinge shaft 81 cannot slide in the front-rear direction, the platen shaft 10*a* cannot pass along the locus S23 and, accordingly, the platen shaft 10*a* cannot reach the bottom part 26*c*. By virtue of the body-side shaft-supporting long holes 82 allowing the hinge shaft 81 to slide in the front-rear direction, the platen shaft 10*a* is capable of reaching the bottom part 26*c*.

Note that, when the printer cover 3 has an integral structure instead of the two-layer structure made up of the inner printer cover 36 and the outer printer cover 37, a single pair of right and left printer cover-side shaft-supporting round holes will suffice.

(8) Cover-Side Buffer Members and Body-Side Buffer Members

As shown in FIG. 5, a plurality of body-side buffer members 141 are arranged in the lateral direction on the rear surface part 121 of the body case 2. In the embodiment in FIG. 5, three body-side buffer members 141 are arranged in the lateral direction on each of the right and left sides of the rear surface part 121 of the body case 2.

Similarly, a plurality of cover-side buffer members 151 are arranged in the lateral direction on the rear surface part 123 of the printer cover 3. In the embodiment in FIG. 5, three cover-side buffer members 151 are arranged in the lateral direction of each of the right and left sides of the rear surface part 123 of the printer cover 3.

In an embodiment, as shown in FIG. 5, the body-side buffer members 141 and the cover-side buffer members 151 may form pairs in the identical positions in the lateral direction.

In the embodiment shown in FIG. 5, the body-side buffer members 141 each include a total of five surfaces, i.e., a tip surface 142 and four side surfaces. Similarly, the cover-side buffer members 151 each include a total of five surfaces, i.e., a tip surface 152 and four side surfaces. This is merely an example and the shape of the surfaces of the body-side buffer members 141 and the cover-side buffer members 151 may be designed as appropriate.

(9) Body-Side Connector and Cover-Side Connector

As shown in FIGS. 12, 9, and 13, the body-side connector 301 is provided at a body-side connector placement part 313 (an example of a first position) and the cover-side connector 321 is provided at a cover-side connector placement part 329.

As shown in FIG. 12, when the printer cover 3 is at the closed position, the body-side connector female terminals 303 of the body-side connector 301 and the cover-side connector male terminals 323 of the cover-side connector 321 are brought into contact with each other. The contacts between six body-side connector female terminals 303 and cover-side connector male terminals 323 are on one virtual plane that is parallel to the outer bottom surface 131 of the printer 1.

Figure 6:
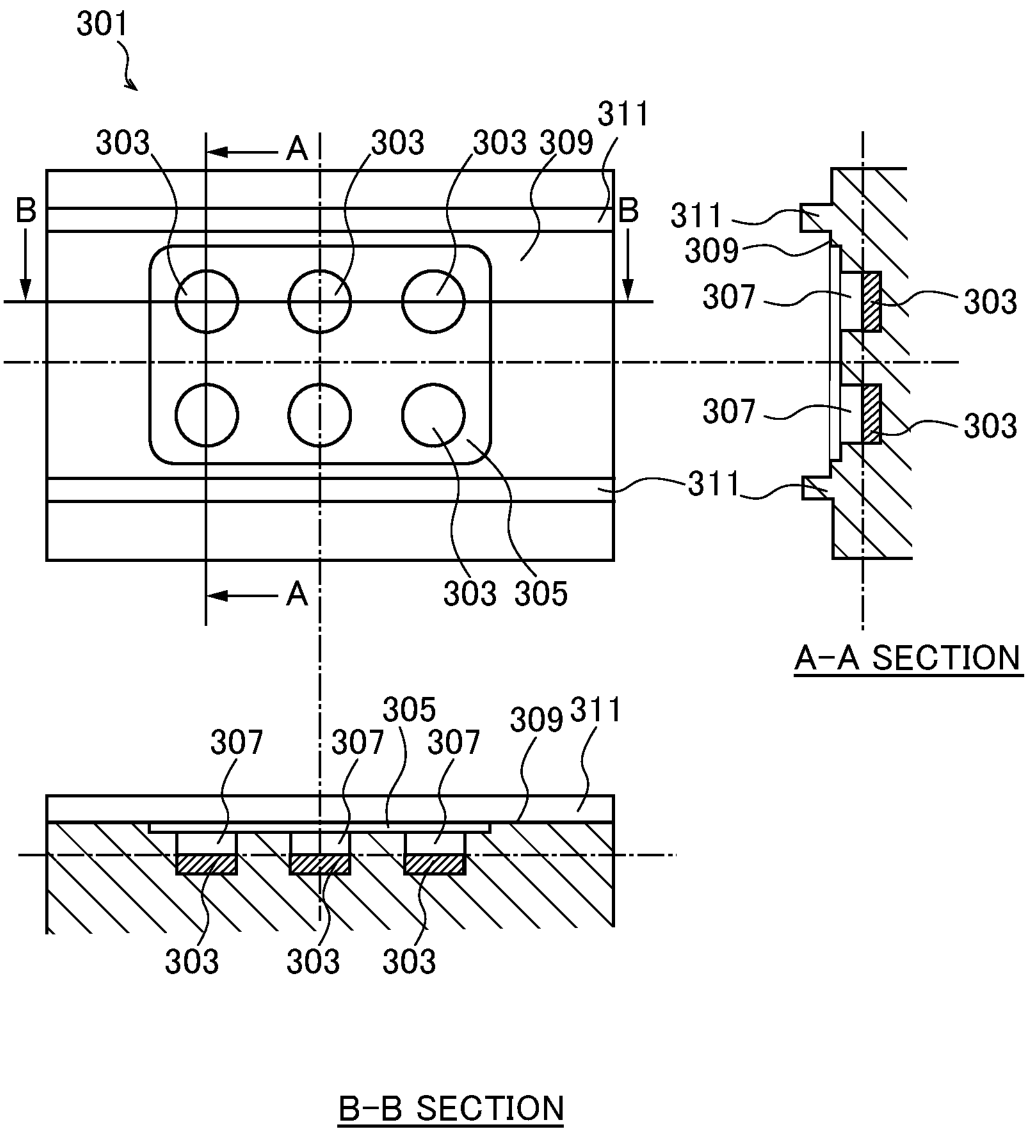
FIG. 6 is a plan view, a cross-sectional view taken along line A-A, and a cross-sectional view taken along line B-B of a body-side connector of the printer according to an embodiment.

With reference to FIGS. 6 and 9, the body-side connector 301 (an example of a first connector) provided at the body-side connector placement part 313 is structured as follows.

A body-side connector first recessed part 305 is provided at a body-side connector abutting surface 309 (an example of a first abutting surface). Inside the body-side connector first recessed part 305, six body-side connector second recesses 307 arranged in a 2×3 matrix are provided. The body-side connector female terminals 303 are disposed at the bottom portion of the body-side connector second recesses 307, respectively.

A pair of lateral projecting portions 311 are provided on both sides of the body-side connector abutting surface 309. The body-side connector abutting surface 309 is parallel to the outer bottom surface 131 of the printer 1.

Figure 16:
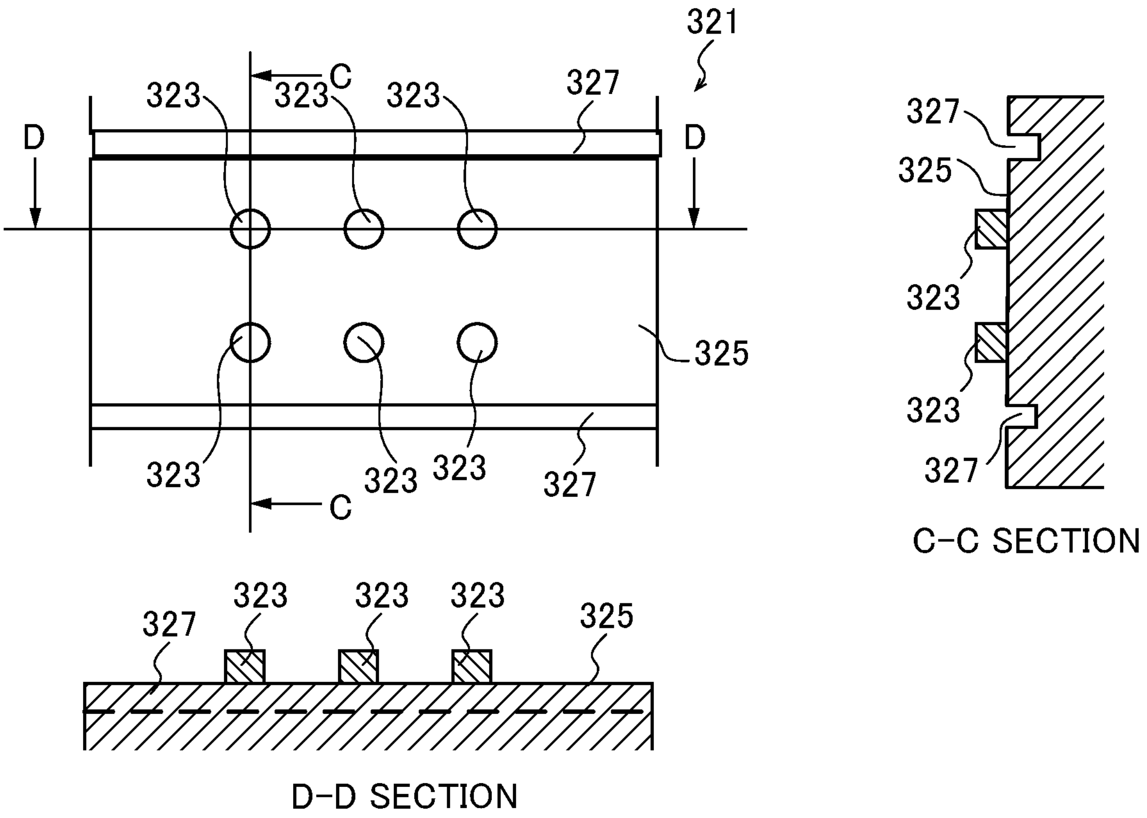
FIG. 16 is a plan view, a cross-sectional view taken along line A-A, and a cross-sectional view taken along line B-B of the cover-side connector of the printer according to an embodiment.

With reference to FIGS. 16 and 13, the cover-side connector 321 (an example of a second connector) provided at the inner printer cover 36 is structured as follows.

At a cover-side connector abutting surface 325 (an example of a second abutting surface), six cover-side connector male terminals 323 arranged in a 2×3 matrix are provided. When the printer cover 3 is at the closed position, the cover-side connector abutting surface 325 is parallel to the outer bottom surface 131 of the printer 1.

A pair of lateral grooves 327 are provided on both sides of the cover-side connector abutting surface 325.

When the printer cover 3 is closed, the six body-side connector female terminals 303 and the six cover-side connector male terminals 323 have their corresponding terminals brought into contact with each other.

As shown in FIG. 12 also, when the printer cover 3 is closed, the cover-side connector abutting surface 325 abuts on the body-side connector abutting surface 309.

The pair of lateral grooves 327 engage with the pair of lateral projecting portions 311. This engagement hardly permits ingress of liquid such as water to the region between the lateral grooves 327 and the lateral projecting portions 311. Since the pair of lateral grooves 327 and the pair of lateral projecting portions 311 extend in the front-rear direction, the engagement prevents the body-side connector abutting surface 309 from sliding in the lateral direction relative to the cover-side connector abutting surface 325. Accordingly, the cover-side connector male terminals 323 are prevented from sliding in the lateral direction relative to corresponding ones of the body-side connector female terminals 303.

In another embodiment, the lateral grooves may be provided at the body-side connector 301 and the lateral projecting portions may be provided at the cover-side connector 321.

Figure 17A:
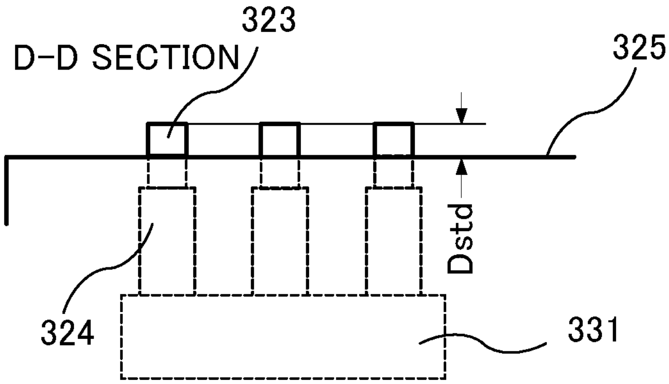
FIG. 17A is a side view of the cover-side connector of the printer according to an embodiment.

With reference to FIG. 17A, the cover-side connector male terminals 323 have portions exposed (projected) outside the cover-side connector abutting surface 325 and portions not exposed. FIG. 16 shows only the portions of the cover-side connector male terminals 323 that are exposed (projected) outside the cover-side connector abutting surface 325.

Figure 17B:
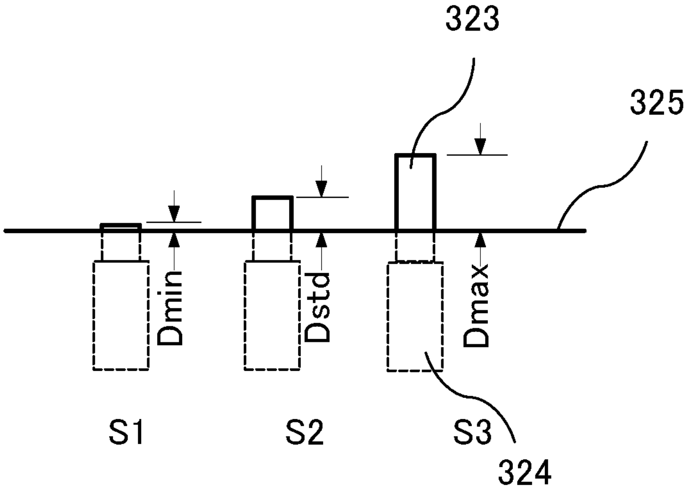
FIG. 17B is a side view of the printer according to an embodiment showing a displacement in the axial direction of a cover-side connector male terminal.

The cover-side connector male terminals 323 are embedded in a cover-side connector male terminal basal part 324, which is cylindrical and greater in diameter than the cover-side connector male terminals 323, in such a manner that the cover-side connector male terminals 323 can be displaced in the axial direction within a predetermined range relative to the cover-side connector male terminal basal part 324 as shown in FIG. 17B.

The cover-side connector male terminal basal part 324 is fixed to the outer printer cover 37 via a fixing member 331.

With reference to FIG. 17B, a length D (the predetermined range) of the portions projecting frontward relative to the cover-side connector abutting surface 325 ranges from a Dmim (minimum length) in a state S1 to a Dmax (maximum length) in a state S3. The cover-side connector male terminals 323 are biased by a spring (not shown), for example, in the direction of increasing the length D of the portions projecting frontward relative to the cover-side connector abutting surface 325.

When the printer cover 3 is open, the cover-side connector male terminals 323 are in the state S3, where length D=Dmax. When the printer cover 3 is closed, the cover-side connector male terminals 323 are in a state S2, in which the length of the portions projecting frontward relative to the cover-side connector abutting surface 325 is defined as Dstd. The length Dstd is a length measured when the printer cover 3 is closed and the cover-side connector abutting surface 325 abuts on the body-side connector abutting surface 309. Here, a relation of Dmim<Dstd<Dmax is satisfied. Preferably, Dstd substantially equals to (Dmim+Dmax)/2 (that is, Dstd≈(Dmim+Dmax)/2).

The length D when the printer cover 3 is open is Dmax. In the process of the printer cover 3 transitioning from the open state to the closed state, the cover-side connector male terminals 323 reach the body-side connector female terminals 303. At this time, the cover-side connector abutting surface 325 is yet to reach the body-side connector abutting surface 309.

As the cover-side connector abutting surface 325 is becoming closer to the body-side connector abutting surface 309, the length D becomes gradually shorter. When the cover-side connector abutting surface 325 reaches the body-side connector abutting surface 309, the length D becomes Dstd.

With reference to FIGS. 2 and 9, in an embodiment, the body-side connector placement part 313 is adjacent to the rear (RR) of the platen shaft retaining portions 26 and to the rear (RR) of the arms 27*g*, in the front-rear direction. In the lateral direction, the body-side connector placement part 313 is at the position substantially identical to the platen shaft retaining portions 26 and adjacent to the left side (LH) (i.e., the outer side) of the arms 27*g*. In the top-bottom direction, the body-side connector placement part 313 is at the height substantially identical to the bottom part 26*c* of the platen shaft retaining portions 26.

The body-side connector placement part 313 is integrated with the body frame. In particular, the body-side connector abutting surface 309 and the pair of lateral projecting portions 311 are formed as part of the body frame.

A magnet may be disposed in the vicinity of both of the body-side connector 301 and the cover-side connector 321. Alternatively, a magnetic may be disposed near one of the connectors 301, 321 and a ferromagnetic element may be disposed in the vicinity of the other one of the connectors 301, 321. In such structures, after the body-side connector 301 and the cover-side connector 321 becomes close to each other, they will attract each other by magnetism, thereby ensuring the connection therebetween.

When the printer cover 3 is at the closed position, the platen shaft 10*a* has its position defined from four sides, namely, the top, bottom, front, and rear sides, by the platen shaft retaining portions 26 and the platen retaining bracket 27. Accordingly, the body-side connector 301 is positioned precisely relative to the platen shaft 10*a*.

On the other hand, as described with reference to FIG. 17A, the fixing member 331 that fixes the cover-side connector male terminal basal part 324 is fixed to the outer printer cover 37, and the cover-side connector abutting surface 325 is a portion of the outer surface of the outer printer cover 37. The platen shaft 10*a* is rotatably fixed to the printer cover 3. Accordingly, in the printer cover 3, the cover-side connector 321 is positioned precisely relative to the platen shaft 10*a*.

Thus, in the printer 1, the body-side connector 301 and the cover-side connector 321 are positioned precisely relative to each other when the printer cover 3 is closed.

As has been described above, when the printer cover 3 is closed, the platen shaft 10*a* has its position defined from four sides, namely, the top, bottom, front, and rear sides, by the platen shaft retaining portions 26 and the platen retaining bracket 27. Thus, the body-side connector 301 and the cover-side connector 321 are positioned precisely relative to each other. As a result, the connection between the body-side connector female terminals 303 and the cover-side connector male terminals 323 is improved.

In another aspect, as shown in FIGS. 9 and 12, in the printer 1, the position (an example of a first position) where the body-side connector placement part 313 is provided is disposed close to, preferably adjacent to, the position (an example of a second position) where the platen retaining bracket 27 retains the second retained portion 10*d* of the platen shaft 10*a*. Thus, the contact position between the body-side connector 301 and the cover-side connector 321 becomes close to the position where the second retained portion 10*d* of the platen shaft 10*a* is retained. This prevents any misalignment of the contact position and improves the connection stability between the connectors.

In FIG. 3, the front-rear direction of the printer 1 is defined as follows: the front side is where the platen roller 10 is, as seen from the direction perpendicular to the outer bottom surface 131 when the printer cover 3 is closed; and the rear side is where the hinge 8 (or the hinge shaft 81) is.

As shown in FIG. 12, the position where the body-side connector placement part 313 is provided is positioned between the position where the platen retaining bracket 27 retains the second retained portion 10*d* of the platen shaft 10*a* and the hinge shaft 81 in the front-rear direction of the printer 1 when the printer cover is closed.

Here, as described above, the displacement of the second retained portions 10*d* of the platen shaft 10*a* in the top-bottom direction is restricted by the platen retaining bracket 27. This improves the connection stability between the body-side connector 301, which is positioned between the second retained portion 10*d* of the platen shaft 10*a* and the hinge shaft 81 in the front-rear direction, and the cover-side connector 321, which is fixed to the printer cover 3 on which the platen shaft 10*a* is mounted.

That is, in the printer 1, by virtue of the contact between the connectors being disposed between the hinge position and the lock position of the printer cover and the body case, the connection stability is improved. If the contact between the connectors was not positioned between the hinge position and the lock position, distortion in the body case or displacement of the lock position would likely result in misalignment of the contact position.

When the body-side connector 301 and the cover-side connector 321 are disconnected from each other while the printer 1 is carried, the settings of a position-detecting sensor 343 and a label sensor 345 are cleared. Therefore, the connection stability between the body-side connector 301 and the cover-side connector 321 is important.

(10) Peripheral Circuit

Figure 18:
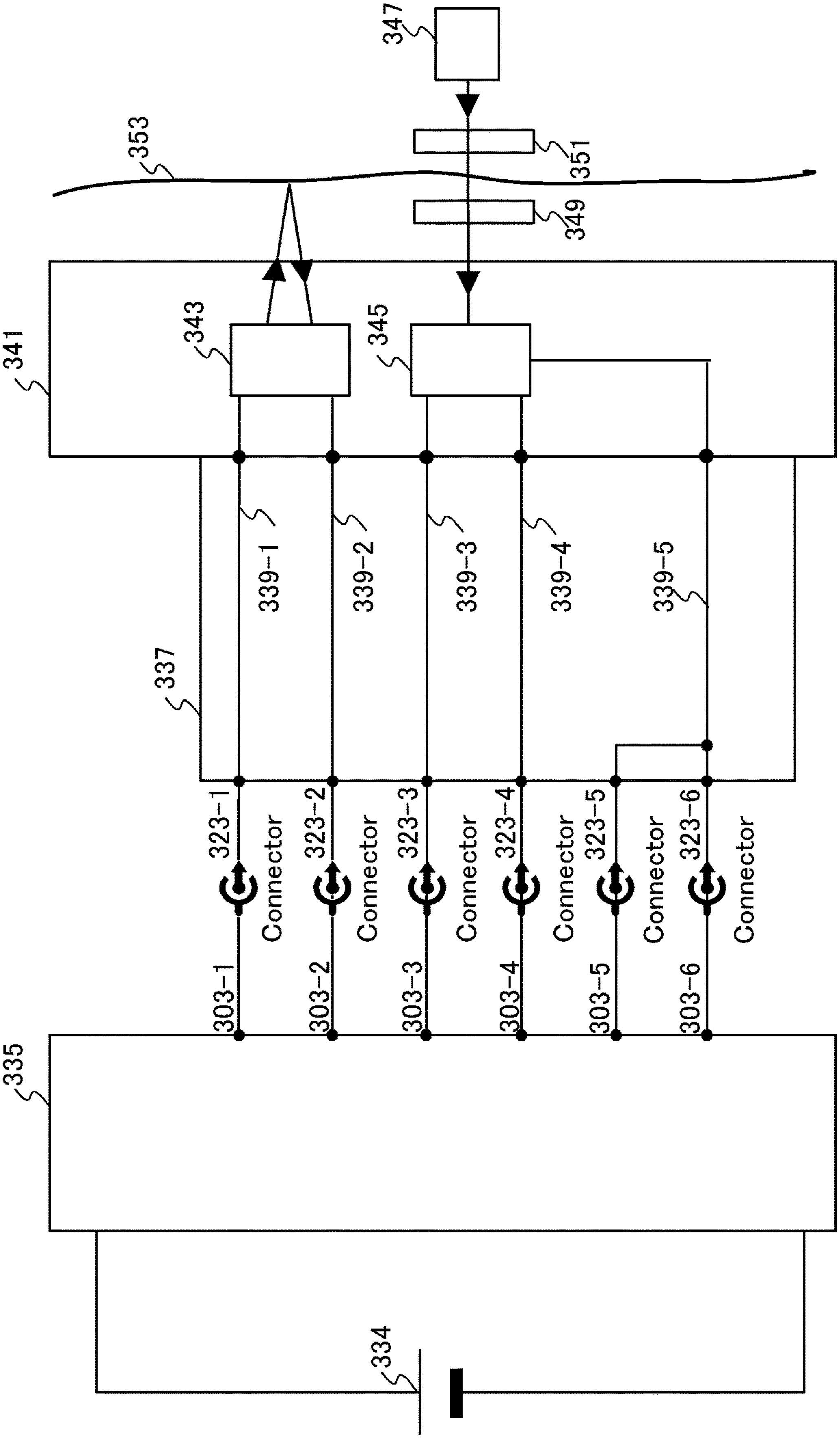
FIG. 18 is a circuit diagram of connectors between the body and the cover and a circuit connected to them in the printer according to an embodiment.

With reference to FIG. 18, the body-side connector female terminals 303-1 to 303-6 are connected to a body-side circuit 335. A power supply 334 is connected to the body-side circuit 335.

Among six sets of body-side connector female terminals 303-1 to 303-6 and cover-side connector male terminals 323-1 to 323-6, the first and second sets of body-side connector female terminals 303-1, 303-2 and cover-side connector male terminals 323-1, 323-2 correspond to the light-reflection type position-detecting sensor 343. The light-reflection type position-detecting sensor 343 emits light toward the continuous sheet 353, and detects black position detection marks on the continuous sheet 353 based on the intensity of reflective light from the continuous sheet 353. A first set of cover-side connector male terminal 323-1 and a second set of cover-side connector male terminal 323-2 are connected to the position-detecting sensor 343 via onboard wires 339-1, 339-2 of a flexible board 337, respectively.

Third and fourth sets of body-side connector female terminals 303-3, 303-4 and cover-side connector male terminals 323-3, 323-4 correspond to the light-transmission type label sensor 345. The light-transmission type label sensor 345 detects the labels on the continuous sheet 353 based on the intensity of light received from a light emitting device 347 via an emitting-side optical filter 351, the continuous sheet 353, and a receiving-side optical filter 349. The third set of cover-side connector male terminal 323-3 and the fourth set of cover-side connector male terminal 323-4 are connected to the label sensor 345 via onboard wires 339-3, 339-4 of the flexible board 337, respectively.

Fifth and sixth sets of body-side connector female terminals 303-5, 303-6 and cover-side connector male terminals 323-5, 323-6 are provided for detecting whether the printer cover 3 is open or closed. The fifth set of cover-side connector male terminal 323-5 and the sixth set of cover-side connector male terminal 323-6 are short-circuited by an onboard wire 339-5 of the flexible board 337.

The sixth set of body-side connector female terminal 303-6 and cover-side connector male terminal 323-6 correspond to a ground line.

With reference to FIG. 2, a continuous sheet path front surface 9*a* and a continuous sheet path rear surface 36*a* are provided at the body and the inner printer cover 36, respectively. When the printer cover 3 is closed, the continuous sheet path front surface 9*a* and the continuous sheet path rear surface 36*a* form a path for the continuous sheet 353 to pass through immediately before reaching the platen roller 10 and the thermal head 28.

The continuous sheet path front surface 9*a* and the continuous sheet path rear surface 36*a* are provided with the emitting-side optical filter 351 and the receiving-side optical filter 349, respectively. When the printer cover 3 is closed, the emitting-side optical filter 351 and the receiving-side optical filter 349 face each other while the continuous sheet 353, which is conveyed from the roll body 355 to the thermal head 28, is interposed between the filters.

The light emitting device 347 is disposed on the inner surface side of the emitting-side optical filter 351. As shown in FIG. 7, a sensor-dedicated board 341 equipped with the label sensor 345 is disposed on the back side of the continuous sheet path rear surface 36*a*. When the printer cover 3 is closed, the label sensor 345 is opposed to the light emitting device 347.

As shown in FIG. 7, the flexible board 337 is connected to the cover-side connector male terminals 323 (not visible in FIG. 7) in the cover-side connector placement part 329. The flexible board 337 is connected to the sensor-dedicated board 341 via the periphery of the inner surface (the surface opposed to the outer printer cover 37) of the inner printer cover 36.

With reference to FIG. 6 again, when the printer cover 3 is open, the body-side connector female terminals 303 are exposed. The body-side connector female terminals 303 is connected to the body-side circuit 335 supplied with power from the power supply 334. Here, the body-side connector female terminals 303 is in a recessed position relative to the body-side connector abutting surface 309. That is, the tips of the body-side connector female terminals 303 brought into contact with the cover-side connector male terminals 323 are positioned in the body-side connector second recesses 307. This prevents electrostatic discharge that would otherwise occur by the user accidentally touching the body-side connector female terminals 303.

When the printer cover 3 is open, the user may accidentally touch the cover-side connector male terminals 323. Here, when the printer cover 3 is open, the position-detecting sensor 343 and the label sensor 345 connected to the cover-side connector male terminals 323 are not supplied with power. This prevents any possible damage to these electronic components due to electrostatic discharge or the like.

While the body-side connector has female terminals and the cover-side connector has male terminals in the illustrated embodiment, the present invention is not limited thereto. The body-side connector may have male terminals and the cover-side connector may have female terminals.

In conventional printers, a sensor at a printer cover and an electronic circuit at a body case are connected by a cable that passes near a hinge that rotatably connects the printer cover to the body case. Thus, the cable is flexed every time the printer cover is opened or closed, which increases risk of breakage of the cable. Besides, since the electronic circuit and the sensor are kept being electrically connected when the printer cover is opened or closed, the electrical connection may be disturbed. Furthermore, dedicated components for wiring the cable must be separately prepared and wired with some burden. These problems are obstacle in replacing the printer cover.

In contrast, the printer 1 according to the present embodiment does not employ such a cable that passes near the hinge 8 that rotatably connects the printer cover 3 to the body case 2. Accordingly, there will be no breakage of a cable due to the opening or closing operation of the printer cover. Furthermore, this eliminates the necessity of separately preparing the component for wiring the cable. Without any burden in wiring the cable, the printer cover 3 can be replaced with ease.

When the printer cover 3 is open, none of the position-detecting sensor 343 and the label sensor 345 and other circuit components at the printer cover 3 are electrically connected to the body-side circuit 335 (an example of a circuit connected to a power supply). This prevents electric troubles such as discharging by these electronic components at the printer cover 3 when the printer cover 3 is open.

As shown in FIG. 3, the platen roller 10 in printing is biased rearward by the coil spring 157 via the thermal head 28 and the print medium. The biasing direction of the coil spring 157 is the front-rear direction of the printer 1. Here, as shown in FIG. 15, since the platen shaft 10*a* is supported from behind by the rear walls 26*e* of the platen shaft retaining portions 26, the platen shaft 10*a* is prevented from being displaced rearward.

The engagement between the lateral projecting portions 311 and the lateral grooves 327 is maintained. Therefore, while being restricted from shifting in the lateral direction relative to the body-side connector abutting surface 309, the cover-side connector abutting surface 325 can shift in the front-rear direction. Even if the platen shaft 10*a* slightly shifts in the front-rear direction, the contact between the connectors is maintained while the cover-side connector abutting surface 325 slides in the front-rear direction on the body-side connector abutting surface 309.

Furthermore, even when the distance from the body-side connector abutting surface 309 to the cover-side connector abutting surface 325 varies due to variations in the position or attitude of the platen roller 10 in the front-rear direction, the connection between the body-side connector 301 and the cover-side connector 321 is maintained well. That is, as shown in FIG. 17B, the cover-side connector male terminals 323 are biased in the direction of increasing the length of the portions projecting frontward relative to the cover-side connector abutting surface 325. Since a change in the projecting length of the cover-side connector male terminals 323 absorbs the distance variations, the contact between the body-side connector female terminals 303 and the cover-side connector male terminals 323 is maintained well.

Next, the shock-absorption property will be discussed.

Figure 19:
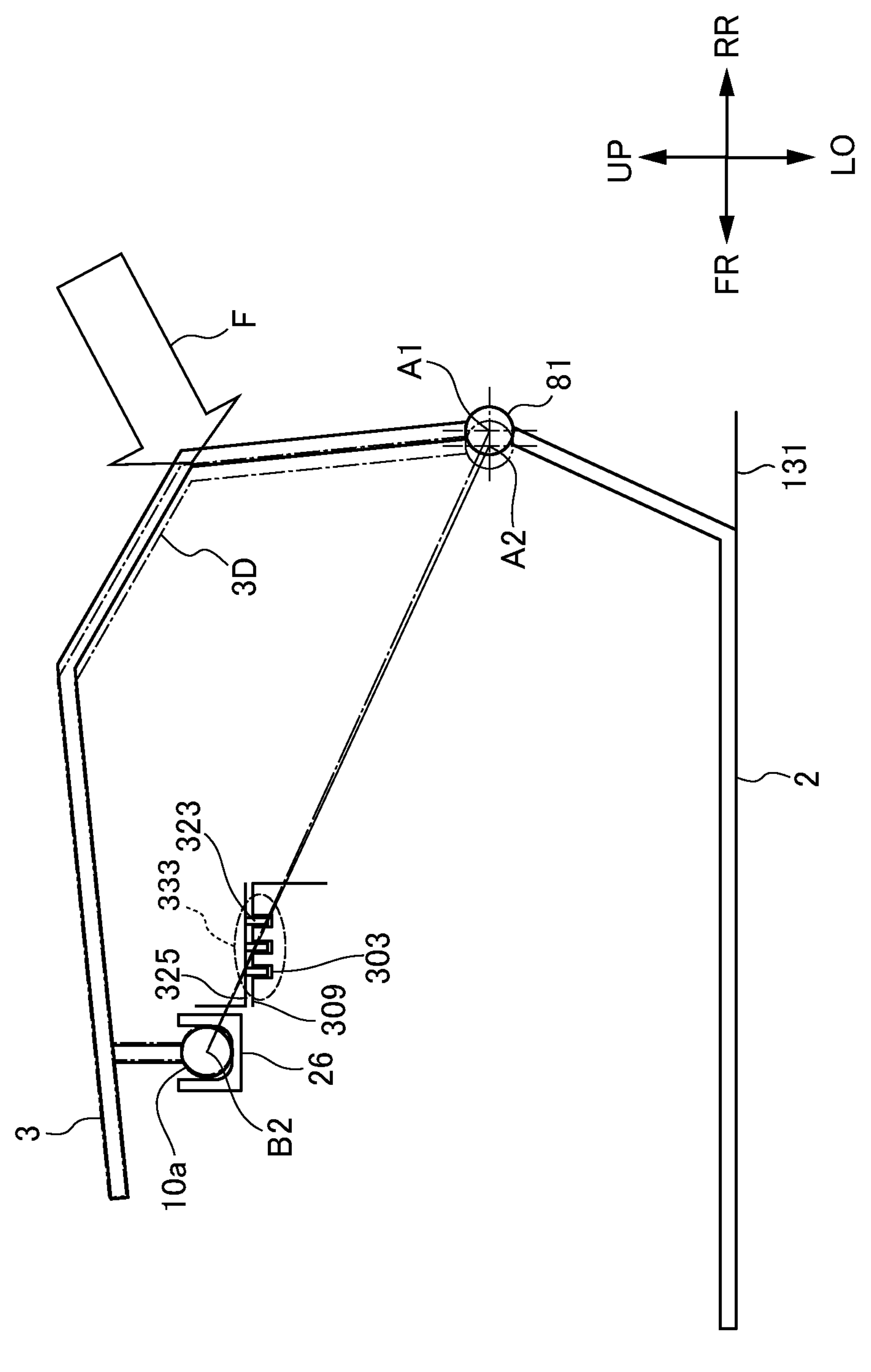
FIG. 19 is a side view of the printer cover of the printer according to an embodiment in which the printer cover deforms under an applied shock from outside.

As shown in FIG. 19, when any shock (external force F) is applied to the printer cover 3 from outside, the hinge shaft 81 may deform to slide along the body-side shaft-supporting long holes 82 (see FIG. 14) and absorb the shock.

In other cases, when any shock is applied to the printer cover 3 from outside, the hinge shaft 81 may slide along the body-side shaft-supporting long holes 82, and the platen roller 10 may slide in the front-rear direction and absorb the shock while the platen shaft 10*a* is retained by the pair of arms 27*g* of the platen retaining bracket 27.

Even under such a shock, the connection between body-side connector female terminals 303 and the cover-side connector male terminals 323 is maintained well for the following reasons.

The long axes of the body-side shaft-supporting long holes 82 extend in the front-rear direction so that the hinge shaft 81 slides in the direction perpendicular to the hinge shaft 81 in a plane horizontal to the outer bottom surface 131 of the printer 1.

As described above, the body-side connector abutting surface 309 and the cover-side connector abutting surface 325 are horizontal relative to the outer bottom surface 131 of the printer 1.

As shown in FIG. 12, when the printer cover 3 is at the closed position, the orientation of the upward-displacement preventing surface 27*k* and the downward-displacement preventing surface 2'7*p* above and below the holding portion groove 27*b* is substantially the same as the orientation of the body-side connector abutting surface 309 and the cover-side connector abutting surface 325.

Accordingly, even when any shock is applied from outside, status of the contact between the body-side connector abutting surface 309 and the cover-side connector abutting surface 325 hardly changes, and the contact between the body-side connector female terminals 303 and the cover-side connector male terminals 323 is maintained well.

The cover-side connector male terminals 323 are biased in the direction of increasing the length of the portions projecting frontward relative to the cover-side connector abutting surface 325. Therefore, even when the distance in the top-bottom direction from the body-side connector abutting surface 309 to the cover-side connector abutting surface 325 varies due to a shock, a change in the projecting length of the cover-side connector male terminals 323 absorbs the distance variations. Thus, the contact between body-side connector female terminals 303 and the cover-side connector male terminals 323 is maintained well.

The printer 1 can be placed upright. That is, as shown in FIGS. 4 and 5, tip surfaces 142 of their respective body-side buffer members 141 and tip surfaces 152 of their respective cover-side buffer members 151 are provided. The printer 1 can be placed upright such as a planar face PL comprised of those tip surfaces is a bottom surface of the printer 1.

For example, when the printer 1 is to be disposed on a plane not perfectly flat, or when the printer 1 is to be disposed upright on a slightly inclined plane, the hinge shaft 81 may slide along the body-side shaft-supporting long holes 82. In this case, the printer cover 3 may slide relative to the body case 2.

In such a case, due to the same reason as explained with reference to the shock absorption property, status of the contact between the body-side connector abutting surface 309 and the cover-side connector abutting surface 325 hardly changes, and the contact between the body-side connector female terminals 303 and the cover-side connector male terminals 323 is maintained well.

The present invention can be implemented in various other modes without departing from its spirit or main characteristics. Therefore, each of the embodiments is merely illustrative and should not be construed as limiting. The scope of the present invention is indicated by the claims and is not bound by the description of the specification. Any modifications or changes that fall within the equivalent scope of claims are within the scope of the present invention.

For example, in the printer 1, while it has been described that the platen shaft 10*a* has its position defined from four sides, namely, the top, bottom, front, and rear sides by the platen shaft retaining portions 26 and the platen retaining bracket 27, the present invention is not limited thereto. The platen shaft retaining portions 26 may be removed, and the displacement of the platen shaft 10*a* may be restricted by the platen retaining bracket 27 alone. In this structure, as shown in FIG. 11, the platen shaft 10*a* is also restricted in the top-bottom direction by two surfaces, namely, the upward-displacement preventing surface 27*k* and the downward-displacement preventing surface 27*p*. This precisely positions the body-side connector 301 relative to the platen shaft 10*a* when the printer cover 3 is closed. This enables accuracy in relative positioning of the body-side connector 301 and the cover-side connector 321.

The present invention relates to Japanese Patent Applications Nos. JP 2020-191920 and JP 2021-167817 filed with the Japan Patent Office on Nov. 18, 2020 and Oct. 13, 2021, respectively, all of which are incorporated herein by reference.

The invention claimed is:

1. A printer comprising:

a body case;

a printer cover configured to be openable and closable relative to the body case about a rotary shaft;

a platen roller that is rotatably attached the printer cover;

a print head configured to pinch a print medium with the platen roller when the printer cover is in a closed position and perform printing on the print medium;

a first connector disposed at a first position of the body case;

a second connector disposed at the printer cover such that the second connector is connected to the first connector when the printer cover is in the closed position; and a platen retaining part disposed at a second position of the body case and configured to rotatably retain a first portion of the platen roller and restrict displacement of the platen roller in a top-bottom direction when the printer cover is in the closed position, thereby causing the body case to lock the printer cover in the closed position, the first position being in a vicinity of the second position.

2. The printer according to claim 1, wherein a front-rear direction of the printer is defined such that the platen roller is on a front side and the rotary shaft is on a rear side as seen from a direction perpendicular to a printer bottom surface when the printer cover is in the closed position, and the first position is positioned between the rotary shaft and the second position in the front-rear direction when the printer cover is in the closed position.

3. The printer according to claim 2, wherein:

the body case comprises a long hole through which the rotary shaft is inserted, the long hole allowing the rotary shaft to slide in the front-rear direction of the printer, the body case comprises a pair of surfaces that are opposed to each other, the pair of surfaces configured to retain a second portion of the platen roller in the front-rear direction of the printer, and the first connector and the second connector are connected to each other in a direction along the pair of surfaces.

4. The printer according to claim 3, wherein:

the first connector comprises a first abutting surface that becomes parallel to the printer bottom surface when connected to the second connector, the second connector comprises a second abutting surface that becomes parallel to the printer bottom surface when connected to the first connector, and the second abutting surface of the second connector is slidable in the front-rear direction of the printer on the first abutting surface when the printer cover is in the closed position.

5. The printer according to claim 4, wherein:

the first abutting surface comprises a groove or a projection, the second abutting surface comprises a projection or a groove, and when the printer cover is in the closed position, the groove or the projection of the first abutting surface and the projection or the groove of the second abutting surface engage with each other.

6. The printer according to claim 3, further comprising a biasing member that biases the print head toward the platen roller, wherein a biasing direction of the biasing member is the front-rear direction of the printer.

7. The printer according to claim 1, wherein:

a height direction is defined as a direction perpendicular to a printer bottom surface, and the first position is at a lower position than the platen roller when the printer cover is in the closed position.

8. The printer according to claim 1, wherein:

a height direction is defined as a direction perpendicular to a printer bottom surface, and the first position is at a higher position than a lower end of the printer cover when the printer cover is in the closed position.

9. The printer according to claim 1, wherein:

a distance from a center position of the printer to the first position is longer than a distance from the center position of the printer to the platen retaining part, in a width direction of the printer.

10. The printer according to claim 1, wherein:

the first connector is connected to a circuit connected to a power supply of the printer, and the second connector is connected to the circuit when connected to the first connector.

11. The printer according to claim 1, wherein;

the first connector comprises a female terminal, and the second connector comprises a male terminal.

12. The printer according to claim 11, wherein;

the female terminal of the first connector is disposed in a recess at the body case, the female terminal of the first connector is configured to come in contact with the male terminal of the second connector, and a tip of the female terminal of the first connector is positioned in the recess.

13. The printer according to claim 11, wherein:

the male terminal of the second connector is connected while being biased toward the female terminal of the first connector.

14. The printer according to claim 1, further comprising:

a sensor that is disposed at the printer cover and configured to detect the print medium, wherein:

the sensor and the second connector are connected to each other.

15. The printer according to claim 1, wherein:

the printer cover comprises an inner printer cover and an outer printer cover, and the second connector is provided at the inner printer cover.

16. The printer according to claim 15, further comprising a board that comprises a circuit connected to the second connector on a surface on the outer printer cover side of the inner printer cover.

17. The printer according to claim 1, wherein a magnet is disposed in a vicinity of both of the first connector and the second connector, or a magnet is disposed in a vicinity of one of the connectors and a ferromagnetic element is disposed in a vicinity of the other one of the connectors.

18. The printer according to claim 1, wherein:

the first connector comprises a terminal at a bottom of a recess in the body case, and a tip of the terminal is positioned in the recess.

19. The printer according to claim 1, wherein:

the first connector comprises a plurality of female terminals, each of which is disposed at a bottom of each of a plurality of recesses in the body case arranged in a matrix, the second connector comprises a plurality of male terminals arranged in a matrix, and when the printer cover is closed, the plurality of female terminals and the plurality of male terminal are brought into contact with each other.

20. A printer comprising:

a body case;

a printer cover configured to be openable and closable relative to the body case about a rotary shaft;

a platen roller that is rotatably attached the printer cover;

a print head configured to pinch a print medium with the platen roller when the printer cover is in a closed position and perform printing on the print medium;

a first connector disposed at a first position of the body case;

a second connector disposed at the printer cover such that the second connector is connected to the first connector when the printer cover is in the closed position; and a platen retaining part disposed at a second position of the body case and configured to rotatably retain a first portion of the platen roller when the printer cover is in the closed position, the first position being in a vicinity of the second position, wherein:

a front-rear direction of the printer is defined such that the platen roller is on a front side and the rotary shaft is on a rear side as seen from a direction perpendicular to a printer bottom surface when the printer cover is in the closed position, the first position is between the rotary shaft and the second position in the front-rear direction when the printer cover is in the closed position, the body case comprises a long hole through which the rotary shaft is inserted, the long hole allowing the rotary shaft to slide in the front-rear direction of the printer, the body case comprises a pair of surfaces that are opposed to each other, the pair of surfaces configured to retain a second portion of the platen roller in the front-rear direction of the printer, and the first connector and the second connector are connected to each other in a direction along the pair of surfaces.

* * * * *